(12) United States Patent
Alexander

(10) Patent No.: US 9,431,888 B1
(45) Date of Patent: Aug. 30, 2016

(54) SINGLE-PHASE TO THREE PHASE CONVERTER AC MOTOR DRIVE

(71) Applicant: Ideal Power, Inc., Spicewood, TX (US)

(72) Inventor: William C. Alexander, Spicewood, TX (US)

(73) Assignee: IDEAL POWER, INC., Spicewood, TX (US)

( * ) Notice: Subject to any disclaimer, the term of this patent is extended or adjusted under 35 U.S.C. 154(b) by 229 days.

(21) Appl. No.: 14/182,250

(22) Filed: Feb. 17, 2014

Related U.S. Application Data

(63) Continuation-in-part of application No. 13/872,962, filed on Apr. 29, 2013, now Pat. No. 9,118,247, which is a continuation of application No. 13/542,223, filed on Jul. 5, 2012, now Pat. No. 8,514,601, which is a continuation of application No. 13/205,225, filed on Aug. 8, 2011, now Pat. No. 8,295,069, which is a continuation of application No. PCT/US2010/045819, filed on Aug. 17, 2010, application No. 14/182,250, which is a continuation-in-part of application No. 13/859,265, filed on Apr. 9, 2013, now Pat. No. 9,130,461, which is a continuation of application No. 13/214,575, filed on Aug. 22, 2011, now abandoned, which is a continuation of application No. 12/479,207, filed on Jun. 5, 2009, now Pat. No. 8,300,426, which is a continuation of application No. 11/759,006, filed on Jun. 6, 2007, now Pat. No. 7,599,196.

(60) Provisional application No. 61/765,104, filed on Feb. 15, 2013, provisional application No. 61/234,373, filed on Aug. 17, 2009, provisional application No. 60/811,191, filed on Jun. 6, 2006.

(51) Int. Cl.
| | |
|---|---|
| H02M 7/5387 | (2007.01) |
| H02M 1/08 | (2006.01) |
| H02M 3/335 | (2006.01) |
| H02M 5/458 | (2006.01) |

(52) U.S. Cl.
CPC ........... *H02M 1/08* (2013.01); *H02M 3/33507* (2013.01); *H02M 5/458* (2013.01); *H02M 7/5387* (2013.01)

(58) Field of Classification Search
CPC ...... H02M 1/08; H02M 1/008; H02M 3/335; H02M 3/33584; H02M 5/22; H02M 5/225; H02M 7/48; H02M 7/4807; H02M 7/5387
See application file for complete search history.

(56) References Cited

U.S. PATENT DOCUMENTS

| | | | |
|---|---|---|---|
| 4,777,421 A | 10/1988 | West | |
| 5,969,957 A | 10/1999 | Divan et al. | |
| 7,313,003 B2 * | 12/2007 | Nakahori | H02M 1/32 363/17 |
| 7,599,196 B2 | 10/2009 | Alexander | |
| 7,778,045 B2 | 8/2010 | Alexander | |
| 8,149,596 B2 * | 4/2012 | Lee | H02M 3/3378 363/132 |

(Continued)

*Primary Examiner* — Matthew Nguyen
(74) *Attorney, Agent, or Firm* — Groover & Associates PLLC; Robert Groover; Gwendolyn Groover

(57) ABSTRACT

Methods and systems for power conversion. An energy storage capacitor is contained within an H-bridge subcircuit which allows the capacitor to be connected to the link inductor of a Universal Power Converter with reversible polarity. This provides a "pseudo-phase" drive capability which expands the capabilities of the converter to compensate for zero-crossings in a single-phase power supply. Conversion between, e.g., single phase and three phase power is enabled, in either direction, without sacrificing workload performance.

23 Claims, 37 Drawing Sheets

(56) References Cited

U.S. PATENT DOCUMENTS

| | | |
|---|---|---|
| 8,295,069 B2 | 10/2012 | Alexander |
| 8,300,426 B2 | 10/2012 | Alexander |
| 8,345,452 B2 | 1/2013 | Alexander |
| 8,391,033 B2 | 3/2013 | Alexander |
| 8,395,910 B2 | 3/2013 | Alexander |
| 8,400,800 B2 | 3/2013 | Alexander |
| 8,406,265 B2 | 3/2013 | Sabathil et al. |
| 2012/0051100 A1 | 3/2012 | Alexander |
| 2012/0163035 A1* | 6/2012 | Song .................. H02M 3/33584 363/17 |
| 2012/0268975 A1 | 10/2012 | Alexander |
| 2012/0274138 A1 | 11/2012 | Bundschuh et al. |
| 2012/0279567 A1 | 11/2012 | Alexander |
| 2013/0038129 A1 | 2/2013 | Bundschuh et al. |
| 2014/0063859 A1* | 3/2014 | Jin .................... H02M 3/33592 363/17 |

* cited by examiner

Three Phase Power Converter

Inductor/Capacitor Voltage Ramping between Modes

Voltage Ramping – Between each of Modes 1 - 5

SINGLE-PHASE TO THREE PHASE CONVERTER AC MOTOR DRIVE

CROSS-REFERENCE

Priority is claimed from U.S. Provisional App. No. 61/765,104, filed Feb. 15, 2013, which is hereby incorporated by reference.

Priority is claimed from U.S. patent application Ser. No. 13/872,962, filed Apr. 29, 2013; which is a continuation of U.S. patent application Ser. No. 13/542,223, filed Jul. 5, 2012, and issued as U.S. Pat. No. 8,514,601 on Aug. 20, 2013; which is a continuation of U.S. patent application Ser. No. 13/205,225, filed Aug. 8, 2011, and issued as U.S. Pat. No. 8,295,069 on Oct. 23, 2012; which is a continuation of PCT/US10/45819, filed Aug. 17, 2010; which claims priority from U.S. Provisional App. No. 61/234,373.

Priority is claimed from U.S. patent application Ser. No. 13/859,265, filed Apr. 9, 2013; which is a continuation of U.S. patent application Ser. No. 13/214,575, filed Aug. 22, 2011; which is a continuation of U.S. patent application Ser. No. 12/479,207, filed Jun. 5, 2009, and issued as U.S. Pat. No. 8,300,426 on Oct. 30, 2012; which is a continuation of U.S. patent application Ser. No. 11/759,006, filed Jun. 6, 2007, and issued as U.S. Pat. No. 7,599,196 on Oct. 6, 2009; which claims priority from U.S. Provisional App. No. 60/811,191, filed Jun. 6, 2006. All of the above are hereby incorporated by reference.

BACKGROUND

The present application relates to power conversion methods, systems, and devices, and more particularly to nonresonant conversion architectures.

Note that the points discussed below may reflect the hindsight gained from the disclosed inventions, and are not necessarily admitted to be prior art.

A new kind of power converter was disclosed in U.S. Pat. No. 7,599,196 entitled "Universal power conversion methods," which is incorporated by reference into the present application in its entirety. This patent describes a bidirectional (or multidirectional) power converter which pumps power into and out of a link inductor which is shunted by a capacitor.

The switch arrays at the ports are operated to achieve zero-voltage switching by totally isolating the link inductor+ capacitor combination at times when its voltage is desired to be changed. (When the inductor+capacitor combination is isolated at such times, the inductor's current will change the voltage of the capacitor, as in a resonant circuit. This can even change the sign of the voltage, without loss of energy.) This architecture has subsequently been referred to as a "current-modulating" or "Power Packet Switching" architecture. Bidirectional power switches are used to provide a full bipolar (reversible) connection from each of multiple lines, at each port, to the rails connected to the link inductor and its capacitor. The basic operation of this architecture is shown, in the context of the three-phase to three-phase example of FIG. 1 of U.S. Pat. No. 7,599,196, in the sequence of drawings from FIG. 12a to FIG. 12j of U.S. Pat. No. 7,599,196.

The ports of this converter can be AC or DC, and will normally be bidirectional (at least for AC ports). Individual lines of each port are each connected to a "phase leg," i.e. a pair of switches which permit that line to be connected to either of two "rails" (i.e. the two conductors which are connected to the two ends of the link inductor). It is important to note that these switches are bidirectional, so that there are four current flows possible in each phase leg: the line can source current to either rail, or can sink current from either rail.

Many different improvements and variations are shown in the basic patent. For example, variable-frequency drive is shown (for controlling a three-phase motor from a three-phase power line), DC and single-phase ports are shown (FIG. 21 of U.S. Pat. No. 7,599,196), as well as three- and four-port systems, applications to photovoltaic systems (FIG. 23 of U.S. Pat. No. 7,599,196), applications to Hybrid Electric vehicles (FIG. 24 of U.S. Pat. No. 7,599,196), applications to power conditioning (FIG. 29 of U.S. Pat. No. 7,599,196), half-bridge configurations (FIGS. 25 and 26 of U.S. Pat. No. 7,599,196), systems where a transformer is included (to segment the rails, and allow different operating voltages at different ports) (FIG. 22 of U.S. Pat. No. 7,599, 196), and power combining (FIG. 28 of U.S. Pat. No. 7,599,196).

Improvements and modifications of this basic architecture have also been disclosed in U.S. Pat. Nos. 8,391,033, 8,295,069, 8,531,858, and 8,461,718, all of which are hereby incorporated by reference.

The term "converter" has sometimes been used to refer specifically to DC-to-DC converters, as distinct from DC-AC "inverters" and/or AC-AC frequency-changing "cyclo-converters." However, in the present application the word converter is used more generally, to refer to all of these types and more, and especially to converters using a current-modulating or power-packet-switching architecture.

Power conversion is one of the most important applications of power semiconductors, and plays an important role in many systems. Power conversion can be used to shift the voltage of a power supply to match the operating requirements of a particular load, or to permit use of a variable-voltage or variable current supply, or to compensate for the variation expected in an unreliable power source, or to permit a unit to be usable with a variety of power inputs, or to compensate for shift in "power factor" when an AC supply is connected to a reactive load. In many cases there are different terms for particular kinds of power conversion, e.g. a DC-to-AC converter is often referred to as an inverter, and some types of AC-to-AC converter are referred to as cycloconverters. Many kinds of motor drive can be thought of as a kind of power conversion: for example, a variable-frequency drive can be regarded as a species of power converter in which the frequency of an AC output is adjustable. In the present application the term "power conversion" will be used to refer generically to all of these types.

The present inventor has previously filed on a new class of power converter device operation and device, which provides a nearly universal power conversion architecture. In one version of this architecture, each input line is connected to the middle of one phase leg having two bidirectional switches, and the switches are operated so as to drive the terminals of a link reactance from one input or the other. A corresponding output switch array is used to transfer energy from the link reactance into two or more output terminals as desired, to construct the output waveform desired. Preferably the link reactance includes an inductor which is shunted by a capacitor. This provides a nearly universal hardware architecture, which is operated to implement a desired power-conversion function. This architecture is suitable for DC-AC, AC-AC, and AC-DC conversion. However, the present application teaches additional improvements, which are applicable to these as well as other topologies.

Many DC-DC, DC-AC, and AC-AC Buck-Boost converters are shown in the patent and academic literature. The classic Buck-Boost converter operates the inductor with continuous current, and the inductor can have an input and output winding to form a transfer for isolation and/or voltage/current translation, in which case it is referred to as a Flyback Converter. There are many examples of this basic converter, all of which are necessarily hard switched and therefore do not have the soft-switched attribute, which leads to reduced converter efficiency and higher costs.

In a chain of patent applications dating back to 2006, the present inventor has disclosed a revolutionary new power conversion architecture, known as the "UPC" (or "Universal Power Conversion") architecture. Some of these applications include published US applications US2008/0013351 and US2008/0031019, now issued as U.S. Pat. Nos. 7,599, 196 and 7,778,045, all of which are hereby incorporated by reference. The present application describes further improvements which are particularly advantageous in connection with UPC architectures, and can also be applicable to other architectures.

Motor drives usually provide motor speed control, direction control, start/stop control, torque regulation and protection to components of motors against flows or overloads.

Small residential, commercials, low voltage or low power industrial appliances ordinarily use single-phase motor drives. However, for heavy industrial applications such as compressors or conveyor drives, single-phase motor drives are sometimes not appropriate for efficient work.

Motor drives can use variable-frequency speed depending on the application needs of power converters. Usually, power converters designed for single-phase applications only support single-phase motor drives. Power converters designed for three-phase applications only support three-phase motor drives. There exist various methods to make single-phase or three-phase power converters capable of supporting three-phase or single-phase motor drives, respectively. For example, single-phase power converters can employ additional components, such as electrolytic capacitors, to enable support for three-phase motor drives. However, such additional components are typically expensive, and this type of solution tends to result in poor workload performance, e.g., limited speed range.

Three-phase motor drives are often better adapted to use in industrial appliances than single-phase motor drives. Three-phase motor drive can deliver high power induction, secure power transfer and is capable of producing a rotating magnetic field. However, three-phase converters that exclusively deal with three-phase motor drives, and power converters with additional components, are often neither accessible nor suitable for use, e.g., for some small business and residential applications.

SUMMARY

The present application teaches a new energy-efficient architecture for air conditioners, particularly for residential air conditioners. A power-packet-switching converter provides a variable-frequency drive to the compressor motor, while also providing split-phase power to the fan motor. This provides major gains in power efficiency.

The same combined architecture can be applied to refrigerators or other appliances (especially those where the highest-horsepower motor in the appliance can benefit from variable-speed operation).

The disclosed innovations, in various embodiments, provide one or more of at least the following advantages. However, not all of these advantages result from every one of the innovations disclosed, and this list of advantages does not limit the various claimed inventions.

Higher efficiency in operation;
Longer appliance lifetime;
Enables optimal torque in motor drive applications;
enables optimal speed range in motor drive applications;
enables optimal efficiency in motor drive applications;
cost-effective;
reliable;
compact size;
increased availability of variable frequency drive in residential applications;
increased ability to generate pulsed waveforms from DC or low-frequency power inputs.

BRIEF DESCRIPTION OF THE DRAWINGS

The disclosed inventions will be described with reference to the accompanying drawings, which show important sample embodiments and which are incorporated in the specification hereof by reference, wherein:

FIGS. 3I, 3J, 3K, 3L, 3M, 3N, 3O, 3P, 3Q, and 3R show sample voltage and current waveforms on an inductor during a typical cycle while transferring power at full load from input to output.

FIG. 3AA shows a sample embodiment in a single phase to three phase synchronous motor drive.

FIG. 3BB shows a sample embodiment with dual, parallel, "power modules", each of which consists of 12 bi-directional switches and a parallel inductor/capacitor. More than two power modules can of course be used for additional options in multiway conversion.

FIG. 3CC shows an embodiment of the present inventions as a three phase Power Line Conditioner, in which role it can act as an Active Filter and/or supply or absorb reactive power to control the power factor on the utility lines.

FIG. 3DD shows a sample schematic of a microgrid embodiment.

FIG. 3EE shows another sample embodiment of a microgrid.

DETAILED DESCRIPTION OF SAMPLE EMBODIMENTS

The numerous innovative teachings of the present application will be described with particular reference to presently preferred embodiments (by way of example, and not of limitation). The present application describes several inventions, and none of the statements below should be taken as limiting the claims generally.

DEFINITIONS

Anchoring—Using a switch to fix the voltage of one end of the link of a line voltage. Any change in link voltage will occur on the other end of the link.

Direct Anchoring—Leaving one switch of line pair closed after a charge transfer is complete to anchor the voltage of one end of the link to the line voltage.

Indirect Anchoring—Anchoring that occurs at the start of a charge transfer one the change in link voltage cause one switch to conduct and anchor that end of the link to the line voltage.

Dominant Phase—The phase of the three phase port that has the largest amount of charge to be transfer to the link.

FPGA—Field programmable gate array.

GFDI—Ground fault detection and interruption.

Islanding—When part of a power system consisting of one or more power sources and loads that is, for some period of time, is separated from the rest of the system.

Link—Inductor and capacitor pair that transfer energy between input and output line pairs.

Line pair—Two lines of a port that can transfer energy to or from the link.

Line pair switches—The bidirectional switches that connect a line pair to the link. The switches are composed of two IGBT in series with parallel diodes.

Microgrid—A small power grid to deliver power from a converter to local loads. The converter is the only power source of the microgrid.

Figure 3A:
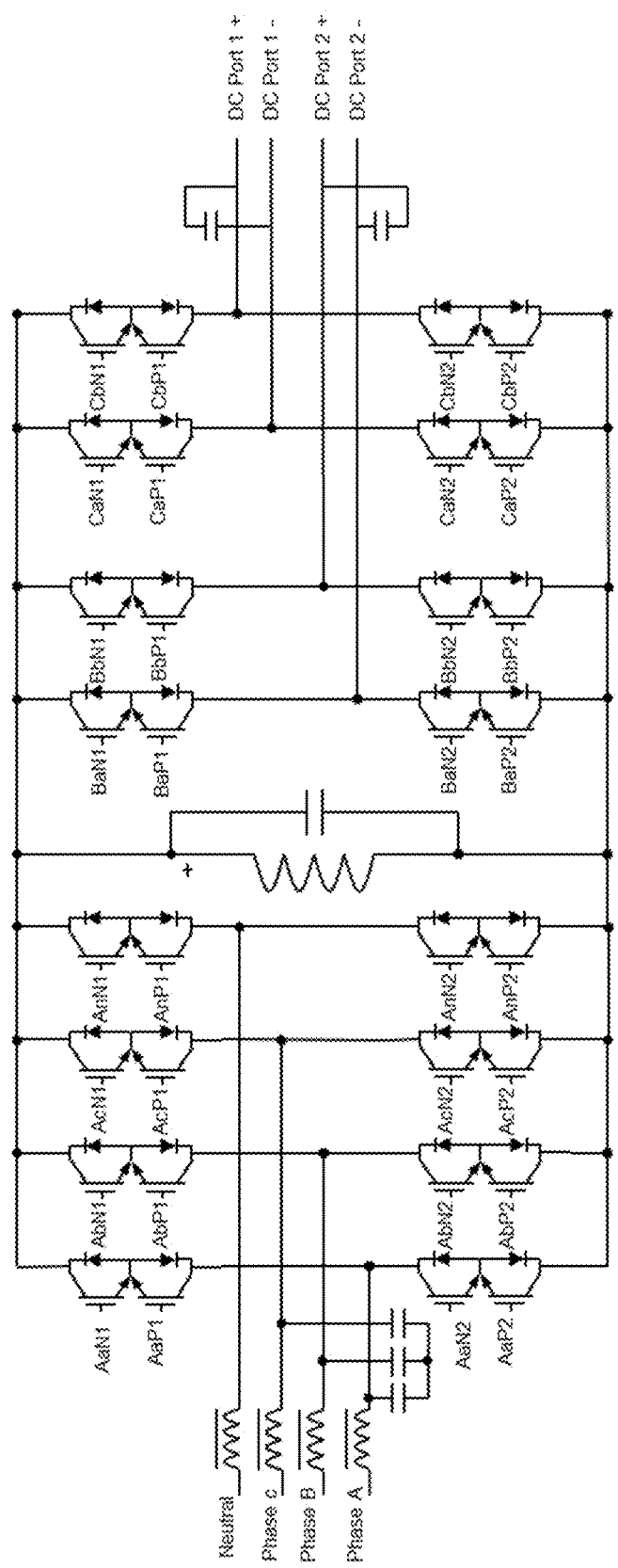
FIG. 3A shows a simplified schematic of a sample power converter.
Figure 3B:
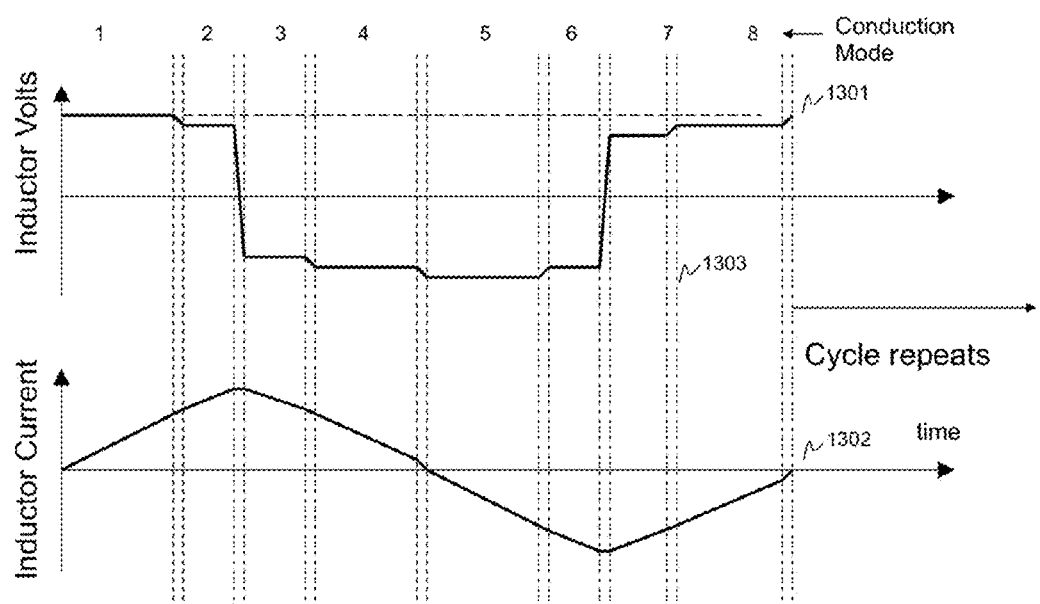
FIG. 3B shows sample voltage and current waveforms for a power cycle of a sample power converter.
Figure 3C:
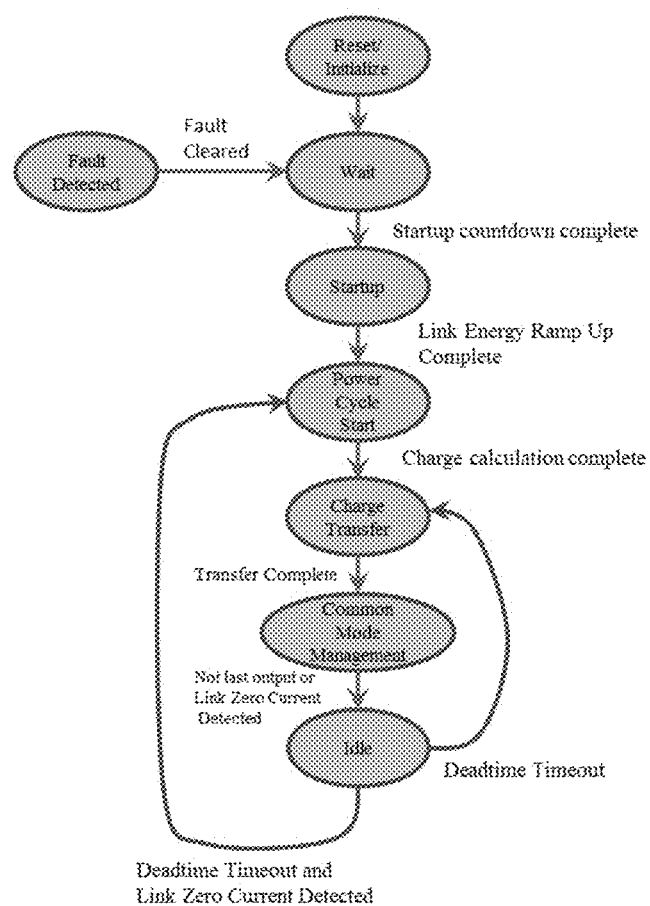
FIG. 3C shows an exemplary finite state machine for one sample control architecture.
Figure 3D:
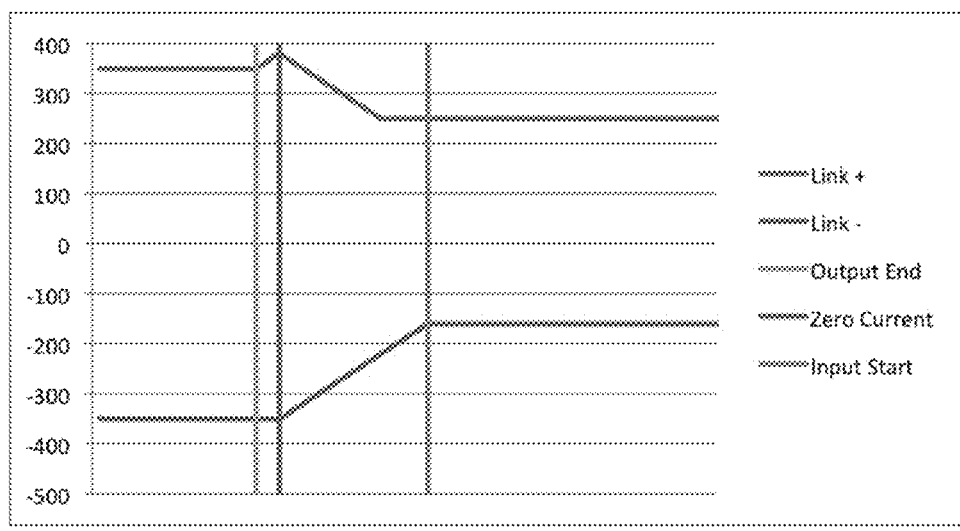
FIGS. 3D, 3E, and 3F show sample embodiments of output and input voltages.
Figure 3E:
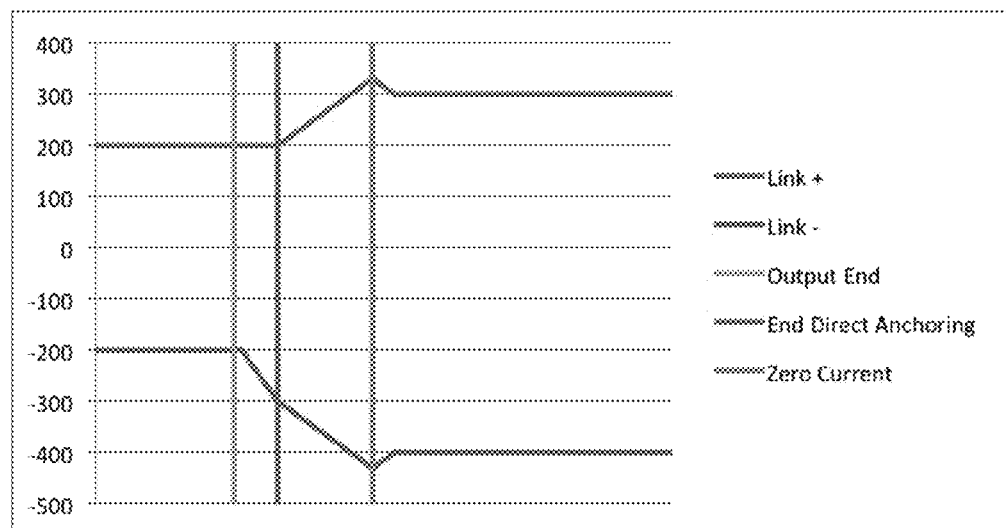
Figure 3F:
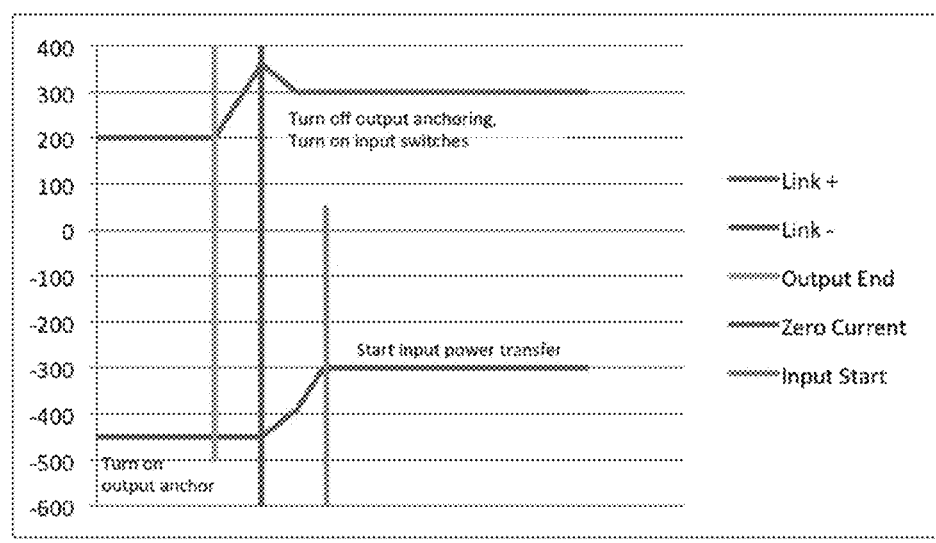
Figure 3G:
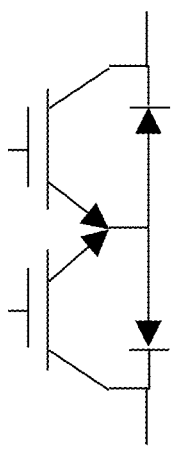
FIG. 3G shows one sample embodiment of a bidirectional switch.
Figure 3H:
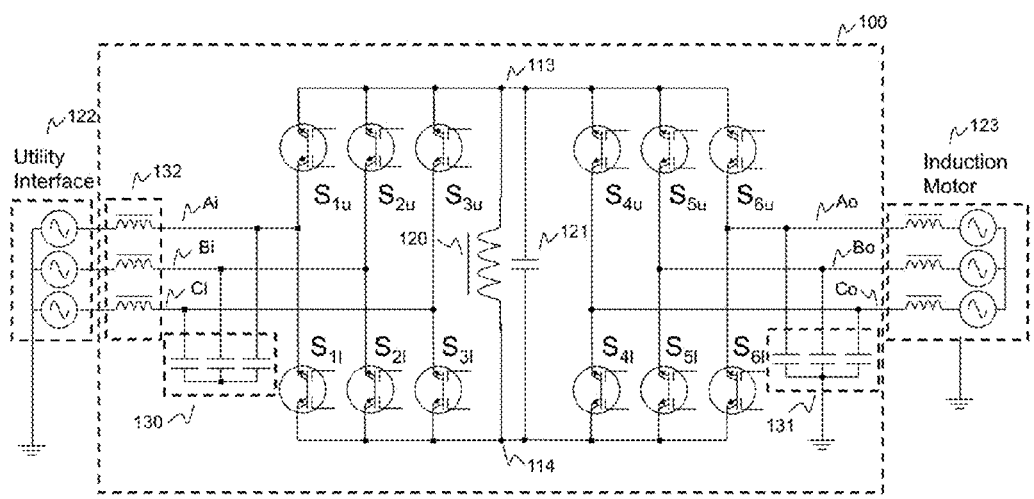
FIG. 3H shows one sample embodiment of a bidirectional current-modulating power converter.

MPPT—Maximum Power Point Tracking, algorithm to maximize the amount of power from a photovoltaic array Referring initially to FIG. 3H, illustrated is a schematic of a sample three phase converter 100 that illustrates the operation of a power-packet-switching converter. The converter 100 is connected to a first and second power ports 122 and 123 each of which can source or sink power, and each with a line for each phase of the port. Converter 100 can transfer electric power between said ports while accommodating a wide range of voltages, current levels, power factors, and frequencies between the ports.

Figure 3I:
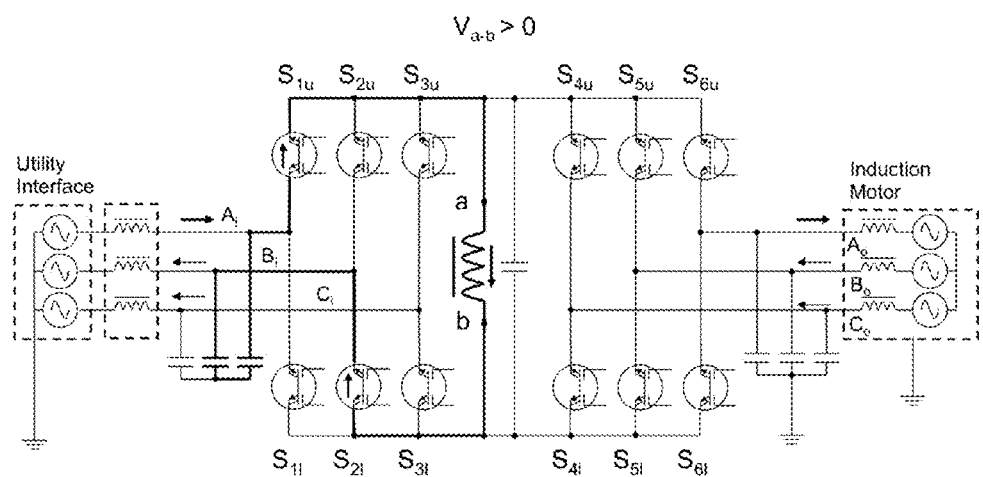
Figure 3J:
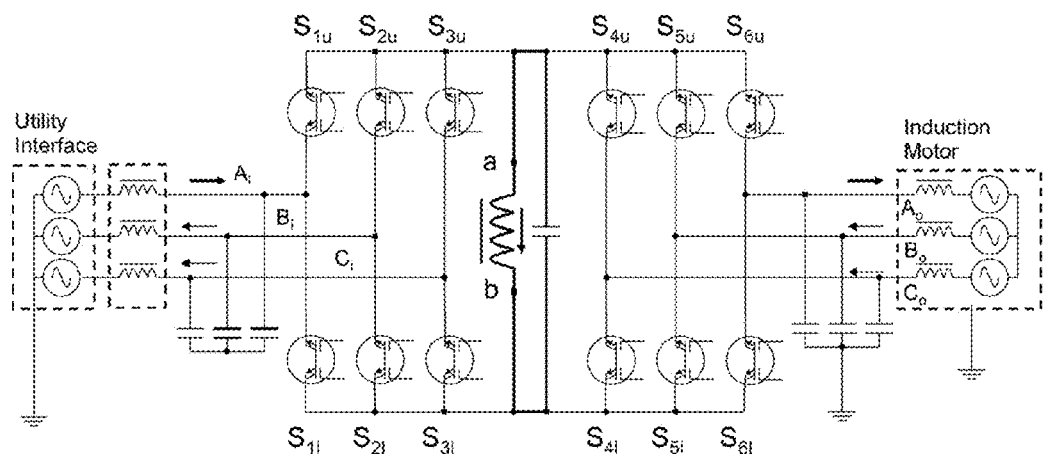
Figure 3K:
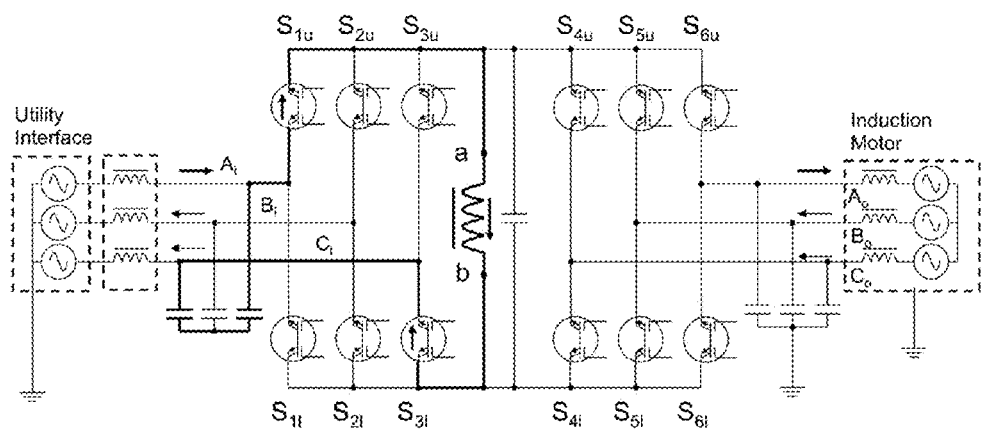
Figure 3L:
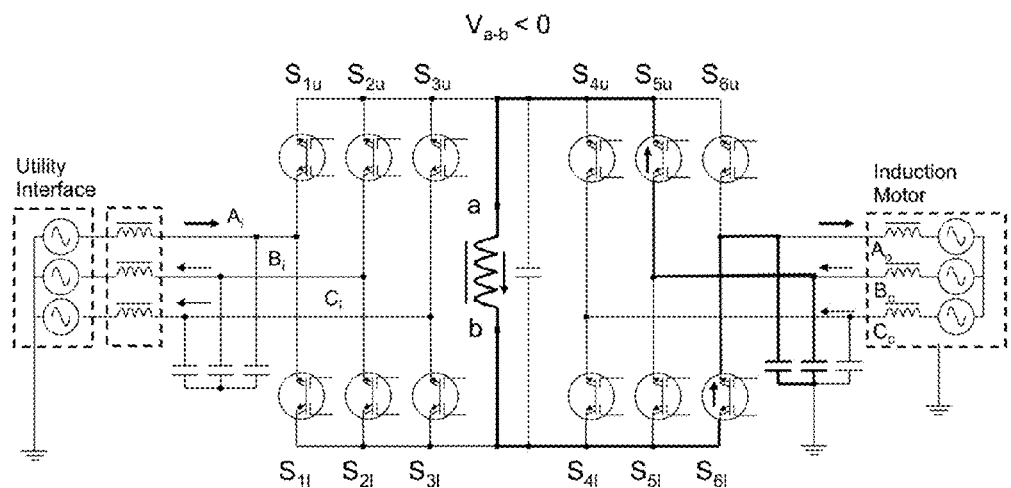
Figure 3M:
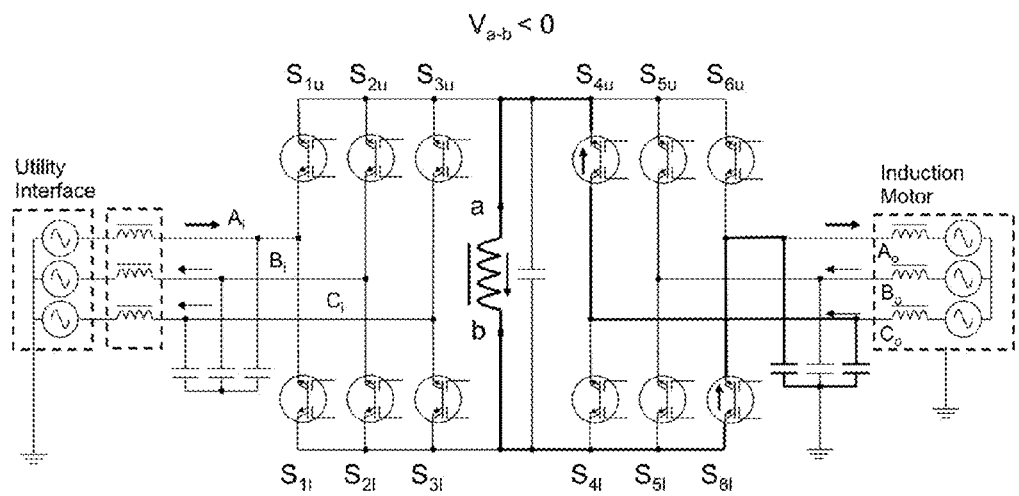
Figure 3N:
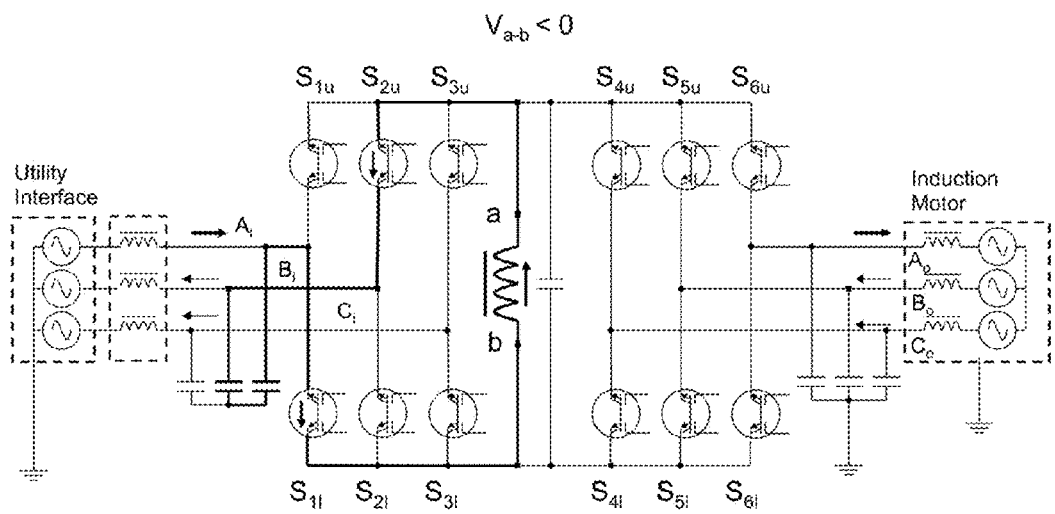
Figure 30:
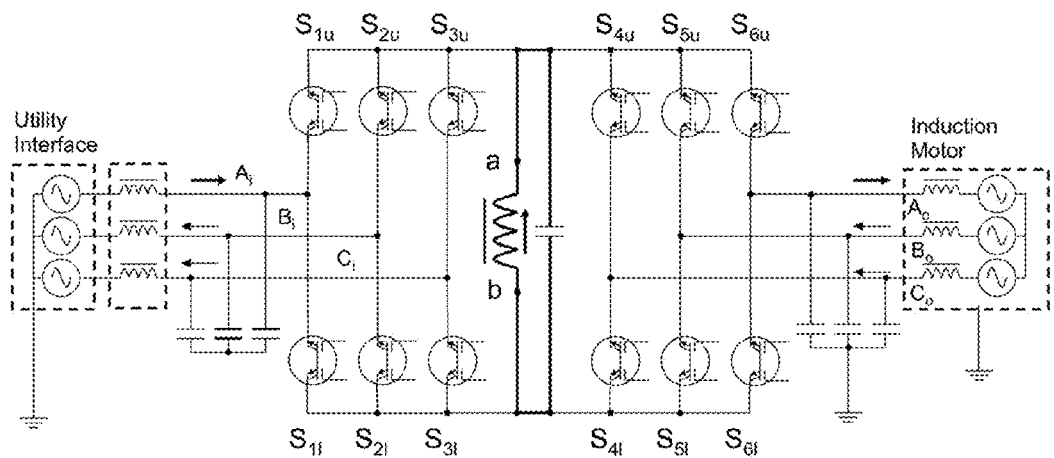
Figure 3P:
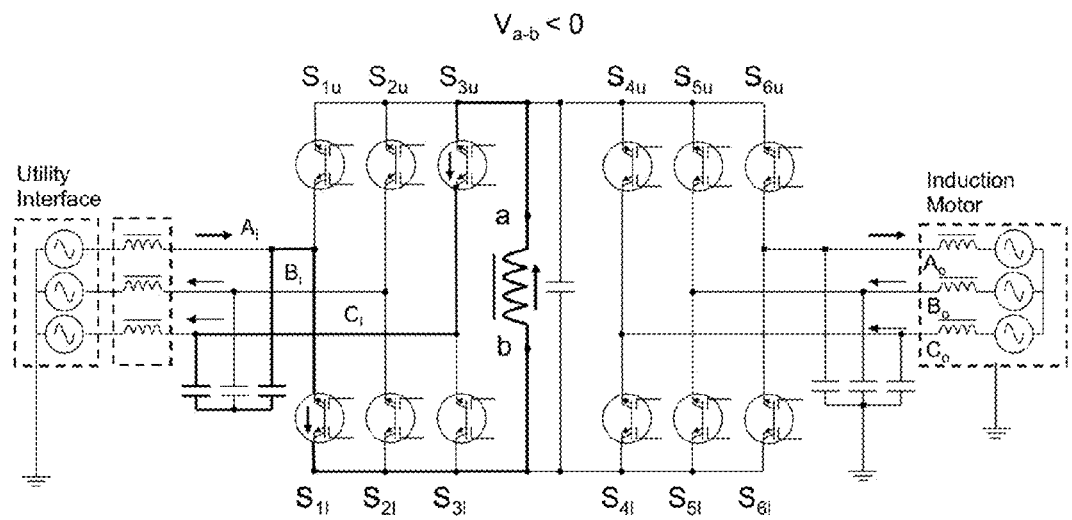
Figure 3Q:
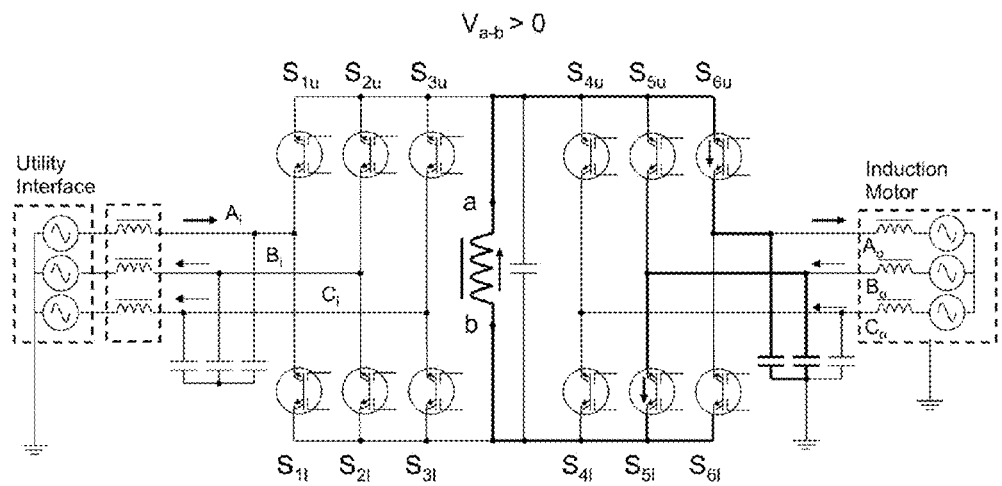
Figure 3R:
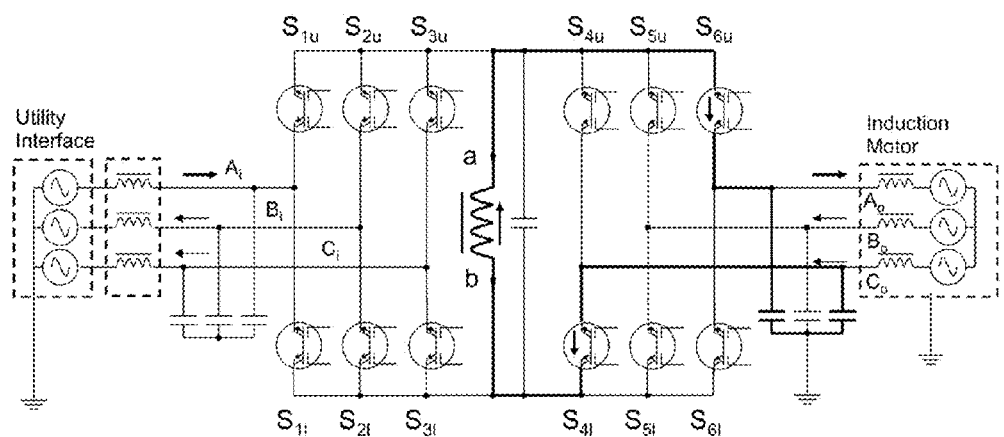

The first port can be for example, a 460 VAC three phase utility connection, while said second port can be a three phase induction motor which is to be operated at variable frequency and voltage so as to achieve variable speed operation of said motor. The present inventions can also accommodate additional ports on the same inductor, as can be desired to accommodate power transfer to and from other power sources and/or sinks, as shown in FIGS. 3W and 3X.

Referring to FIG. 3H, converter 100 is comprised of a first set of electronic switches $S_{1u}$, $S_{2u}$, $S_{3u}$, $S_{4u}$, $S_{5u}$, and $S_{6u}$ that are connected between a first line 113 of a link inductor 120 and each phase, 124 through 129, of the input port, and a second set of electronic switches $S_{1l}$, $S_{2l}$, $S_{3l}$, $S_{4l}$, $S_{5l}$, and $S_{6l}$ that are similarly connected between a second line 114 of link inductor 120 and each phase of the output port. A link capacitor 121 is connected in parallel with the link inductor, forming the link reactance. Each of these switches is capable of conducting current and blocking current in both directions, as seen in e.g. FIG. 3G. Many other such bi-directional switch combinations are also possible.

The converter 100 also has input and output capacitor filters 130 and 131, respectively, which smooth the current pulses produced by switching current into and out of inductor 120. Optionally, a line reactor 132 can be added to the input to isolate the voltage ripple on input capacitor filter 131 from the utility and other equipment that can be attached to the utility lines. Similarly, another line reactor, not shown, can be used on the output if required by the application.

Figure 3S:
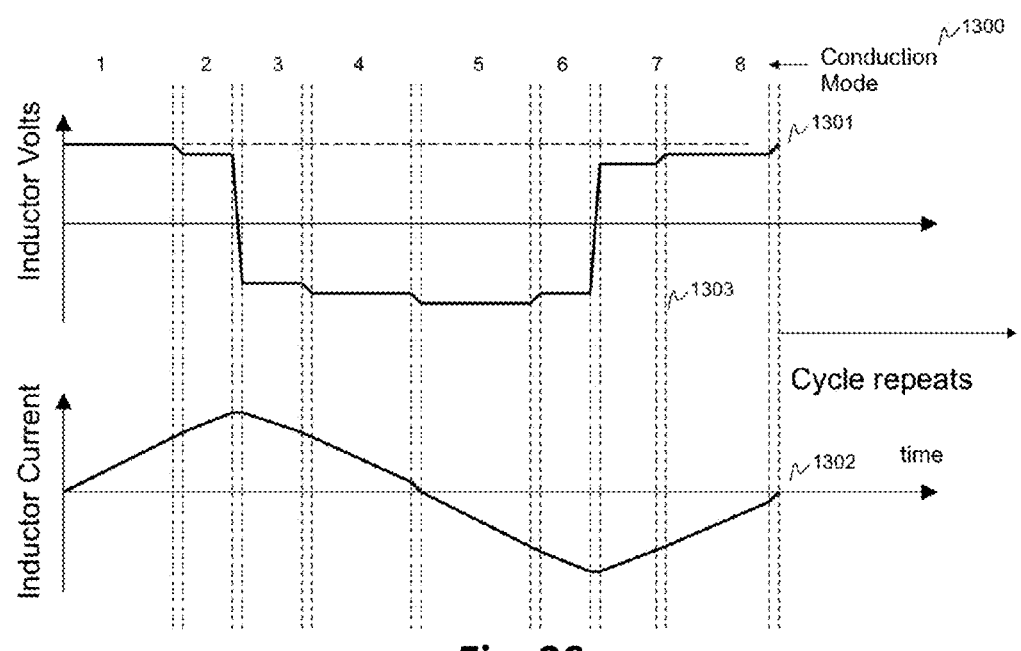
FIG. 3S shows voltage and current waveforms corresponding to the full power condition of FIGS. 3I-3R, with the conduction mode numbers corresponding to the mode numbers of FIGS. 3I-3R.

For illustration purposes, assume that power is to be transferred in a full cycle of the inductor/capacitor from the first to the second port, as is illustrated in FIG. 3S. Also assume that, at the instant the power cycle begins, phases $A_i$ and $B_i$ have the highest line to line voltage of the first (input) port, link inductor 120 has no current, and link capacitor 121 is charged to the same voltage as exists between phase $A_i$ and $B_i$. The controller FPGA 1500, shown in FIG. 3T, now turns on switches $S_{1u}$ and $S_{2l}$, whereupon current begins to flow from phases $A_i$ and $B_i$ into link inductor 120, shown as Mode 1 of FIG. 3I.

FIG. 3S shows the inductor current and voltage during the power cycle of FIGS. 3I-3R, with the Conduction Mode sequence 1300 corresponding to the Conduction Modes of FIGS. 3I-3R. The voltage on the link reactance remains almost constant during each mode interval, varying only by the small amount the phase voltage changes during that interval. After an appropriate current level has been reached, as determined by controller 1500 to achieve the desired level of power transfer and current distribution among the input phases, switch $S_{2l}$ is turned off.

Current now circulates, as shown in FIG. 3J, between link inductor 120 and link capacitor 121, which is included in the circuit to slow the rate of voltage change, which in turn greatly reduces the energy dissipated in each switch as it turns off. In very high frequency embodiments of the present inventions, the capacitor 121 can consist solely of the parasitic capacitance of the inductor and/or other circuit elements. (Note that a similar process is shown in FIG. 3O.)

To continue with the cycle, as shown as Mode 2 in FIG. 3K and FIG. 3S, switch $S_{3l}$ is next enabled, along with the previously enabled switch $S_{1u}$. As soon as the link reactance voltage drops to just less than the voltage across phases $A_i$ and $C_i$, which are assumed for this example to be at a lower line-to-line voltage than phases $A_i$ and $B_i$, switches $S_{1u}$ and $S_{3l}$ become forward biased and start to further increase the current flow into the link inductor, and the current into link capacitor temporarily stops.

The two "on" switches, $S_{1u}$ and $S_{3l}$, are turned off when the desired peak link inductor current is reached, said peak link inductor current determining the maximum energy per cycle that can be transferred to the output. The link inductor and link capacitor then again exchange current, as shown if FIG. 3J, with the result that the voltage on the link reactance changes sign, as shown in graph 1301, between modes 2 and 3 of FIG. 3S. Now as shown in FIG. 3L, output switches $S_{5u}$ and $S_{6l}$ are enabled, and start conducting inductor current into the motor phases $A_o$ and $B_o$, which are assumed in this example to have the lowest line-to-line voltages at the present instance on the motor.

After a portion of the inductor's energy has been transferred to the load, as determined by the controller, switch $S_{5u}$ is turned off, and $S_{4u}$ is enabled, causing current to flow again into the link capacitor. This increases the link inductor voltage until it becomes slightly greater than the line-to-line voltage of phases $A_o$ and $C_o$, which are assumed in this example to have the highest line-to-line voltages on the motor. As shown in FIG. 3M, most of the remaining link inductor energy is then transferred to this phase pair (into the motor), bringing the link inductor current down to a low level.

Switches $S_{4u}$ and $S_{6l}$ are then turned off, causing the link inductor current again to be shunted into the link capacitor, raising the link reactance voltage to the slightly higher input line-to-line voltage on phases $A_i$ and $B_i$. Any excess link inductor energy is returned to the input. The link inductor current then reverses, and the above described link reactance current/voltage half-cycle repeats, but with switches that are complimentary to the first half-cycle, as is shown in FIGS. 3N-3R, and in Conduction Mode sequence 1300, and graphs 1301 and 1302. FIG. 3O shows the link reactance current exchange during the inductor's negative current half-cycle, between conduction modes.

Note that TWO power cycles occur during each link reactance cycle: with reference to FIGS. 3I-3R, power is pumped IN during modes 1 and 2, extracted OUT during modes 3 and 4, IN again during modes 5 and 6 (corresponding to e.g. FIG. 3P), and OUT again during modes 7 (as in e.g. FIG. 3Q) and 8. The use of multi-leg drive produces eight modes rather than four, but even if polyphase input and/or output is not used, the presence of TWO successive in and out cycles during one cycle of the inductor current is notable.

As shown in FIGS. 3I-3S, Conduction Mode sequence 1300, and in graphs 1301 and 1302, the link reactance continues to alternate between being connected to appropriate phase pairs and not connected at all, with current and power transfer occurring while connected, and voltage ramping between phases while disconnected (as occurs between the closely spaced dashed vertical lines of which 1303 in FIG. 3S is one example.

In general, when the controller 1500 deems it necessary, each switch is enabled, as is known in the art, by raising the voltage of the gate 204 on switch 200 above the corresponding terminal 205, as an example. Furthermore, each switch is enabled (in a preferred two gate version of the switch) while the portion of the switch that is being enabled is zero or reverse biased, such that the switch does not start conduction until the changing link reactance voltage causes the switch to become forward biased. Single gate AC switches can be used, as with a one-way switch embedded in a four diode bridge rectifier, but achieving zero-voltage turn on is difficult, and conduction losses are higher.

Figure 3T:
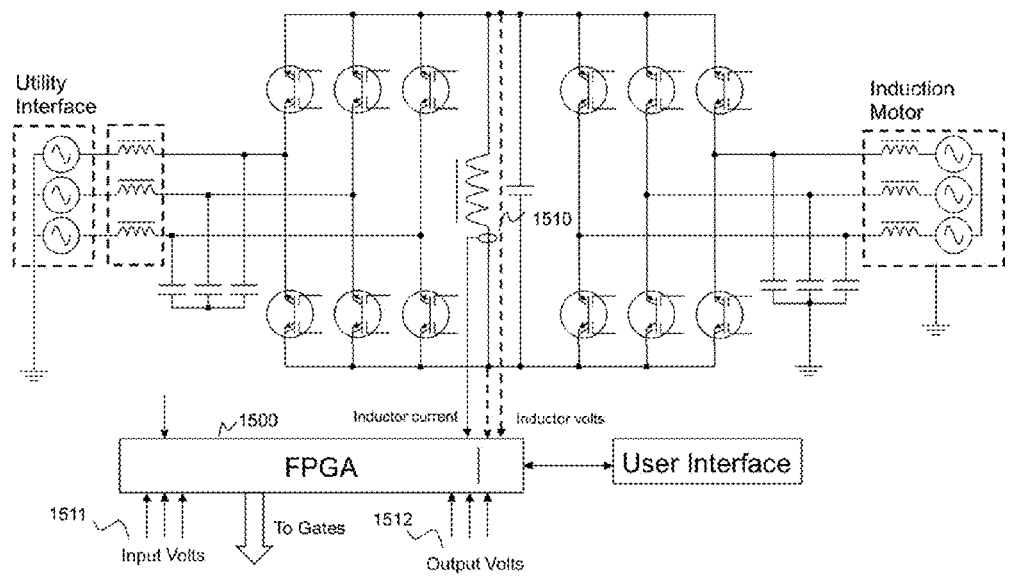
FIG. 3T shows an embodiment of the present inventions with a full bridge three phase cycle topology, with controls and I/O filtering, including a three phase input line reactor as needed to isolate the small but high frequency voltage ripple on the input filter capacitors from the utility.

In FIG. 3T, current through the inductor is sensed by sensor 1510, and the FPGA 1500 integrates current flows to determine the current flowing in each phase (line) of the input and output ports. Phase voltage sensing circuits 1511 and 1512 allow the FPGA 1500 to control which switches to enable next, and when.

FIGS. 3I-3R shows current being drawn and delivered to both pairs of input and output phases, resulting in 4 modes for each direction of link inductor current during a power cycle, for a total of 8 conduction modes since there are two power cycles per link reactance cycle in the preferred embodiment. This distinction is not dependent on the topology, as a three phase converter can be operated in either 2 modes or 4 conduction modes per power cycle, but the preferred method of operation is with 4 conduction modes per power cycle, as that minimizes input and output harmonics.

For single phase AC or DC, it is preferred to have only two conduction modes per power cycle, or four modes per link reactance cycle, as there is only one input and output pair in that case. For mixed situations, as in the embodiment of FIG. 3X which converts between DC or single phase AC and three phase AC, there can be 1 conduction mode for the DC interface, and 2 for the three phase AC, for 3 conduction modes per power cycle, or 6 modes per link reactance cycle. In any case, however, the two conduction modes per power half-cycle for three phase operation together give a similar power transfer effect as the singe conduction mode for single phase AC or DC.

Figure 3U:
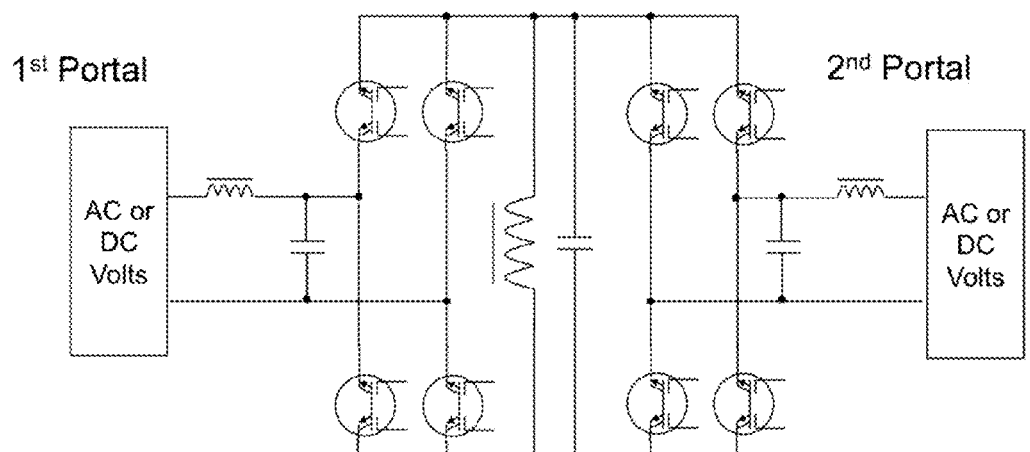
FIG. 3U shows an embodiment of the present inventions with DC or Single Phase portals.

Another sample embodiment of the present inventions is shown in FIG. 3U, which shows a single phase AC or DC to single phase AC or DC converter. Either or both input and output can be AC or DC, with no restrictions on the relative voltages. If a port is DC and can only have power flow either into or out of said port, the switches applied to said port can be uni-directional. An example of this is shown with the photovoltaic array of FIG. 3W, which can only source power.

Figure 3V:
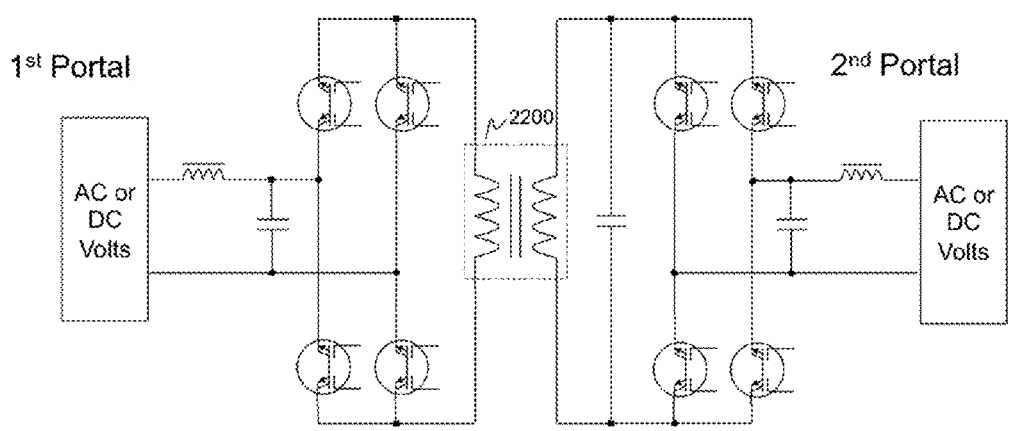
FIG. 3V shows an embodiment of the present inventions with a transformer/inductor.
Figure 3W:
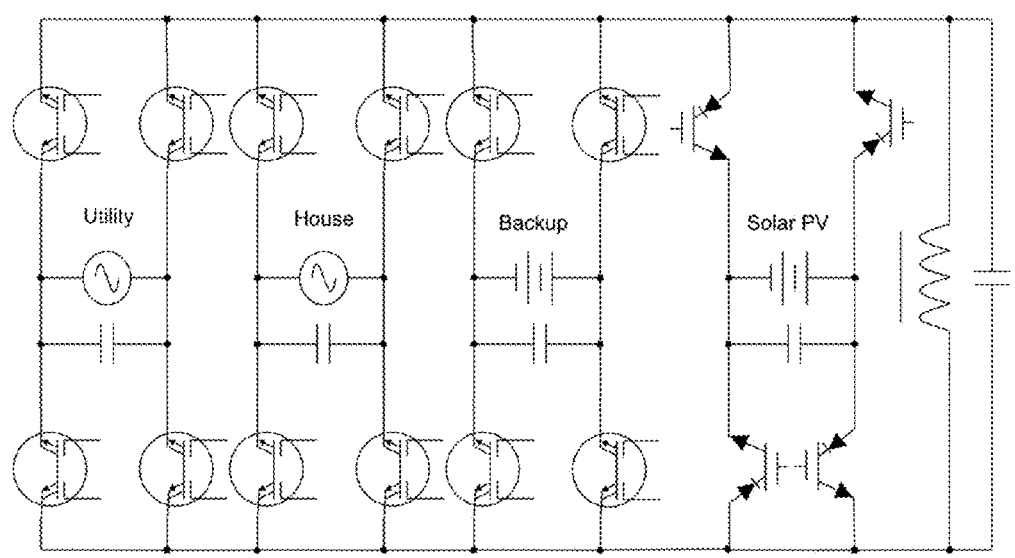
FIG. 3W shows an embodiment of the present inventions in a four portal application mixing single phase AC and multiple DC portals, as can be used to advantage in a solar power application.
Figure 3X:
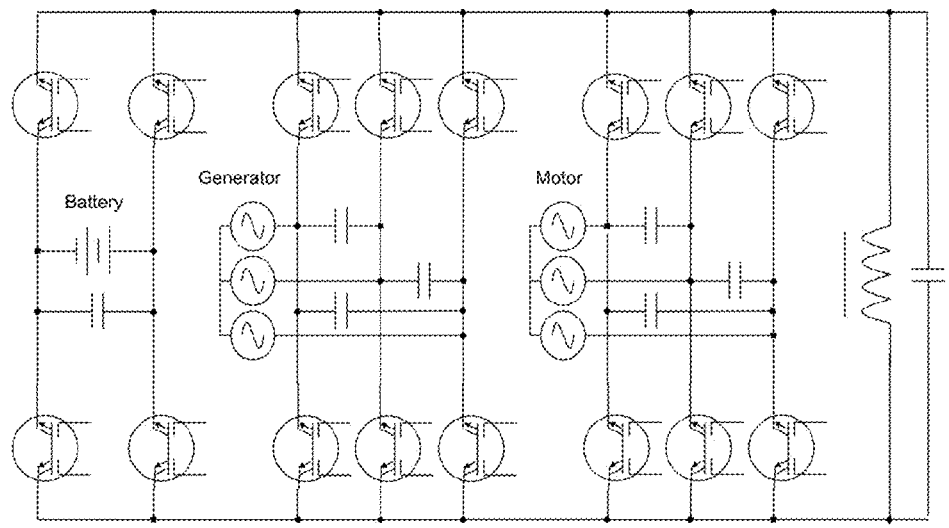
FIG. 3X shows an embodiment of the present inventions in a three portal application mixing three phase AC portals and a DC portal, as can be used to advantage in a Hybrid Electric Vehicle application.

FIG. 3V shows a sample implementation of a Flyback Converter. The circuit of FIG. 3U has been modified, in that the link inductor is replaced with a transformer 2200 that has a magnetizing inductance that functions as the link inductor. Any embodiment of the present inventions can use such a transformer, which can be useful to provide full electrical isolation between ports, and/or to provide voltage and current translation between ports, as is advantageous, for example, when a first port is a low voltage DC battery bank, and a second port is 120 volts AC, or when the converter is used as an active transformer.

In the embodiments of the present inventions shown in FIGS. 3W and 3X, the number of ports attached to the link reactance is more than two, simply by using more switches to connect in additional ports to the inductor. As applied in the solar power system of FIG. 3W, this allows a single converter to direct power flow as needed between the ports, regardless of their polarity or magnitude.

Thus, in one sample embodiment, the solar photovoltaic array can be at full power, e.g. 400 volts output, and delivering 50% of its power to the battery bank at e.g. 320 volts, and 50% to the house AC at e.g. 230 VAC. Prior art requires at least two converters to handle this situation, such as a DC-DC converter to transfer power from the solar PV array to the batteries, and a separate DC-AC converter (inverter) to transfer power from the battery bank to the house, with consequential higher cost and electrical losses. The switches shown attached to the photovoltaic power source need be only one-way since the source is DC and power can only flow out of the source, not in and out as with the battery.

In the sample power converter of FIG. 3X, as can be used for a hybrid electric vehicle, a first port is the vehicle's battery bank, a second port is a variable voltage, variable speed generator run by the vehicle's engine, and a third port is a motor for driving the wheels of the vehicle. A fourth port, not shown, can be external single phase 230 VAC to charge the battery. Using this single converter, power can be exchanged in any direction among the various ports. For example, the motor/generator can be at full output power, with 50% of its power going to the battery, and 50% going to the wheel motor. Then the driver can depress the accelerator, at which time all of the generator power can be instantly applied to the wheel motor. Conversely, if the vehicle is braking, the full wheel motor power can be injected into the battery bank, with all of these modes using a single converter.

Figure 3Y:
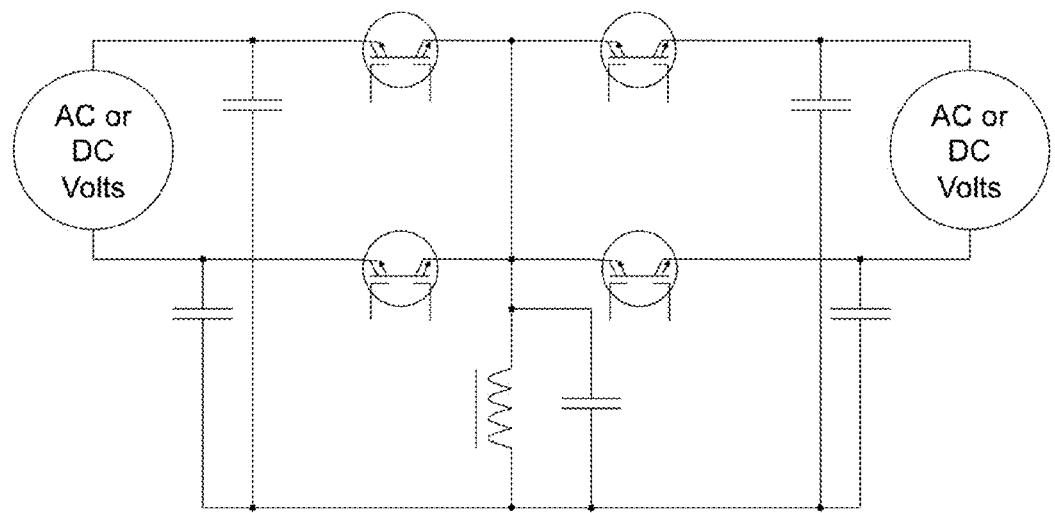
FIG. 3Y shows an embodiment of the present inventions as a Half-Bridge Buck-Boost Converter in a Single Phase AC or DC Topology with BCBS.
Figure 3Z:
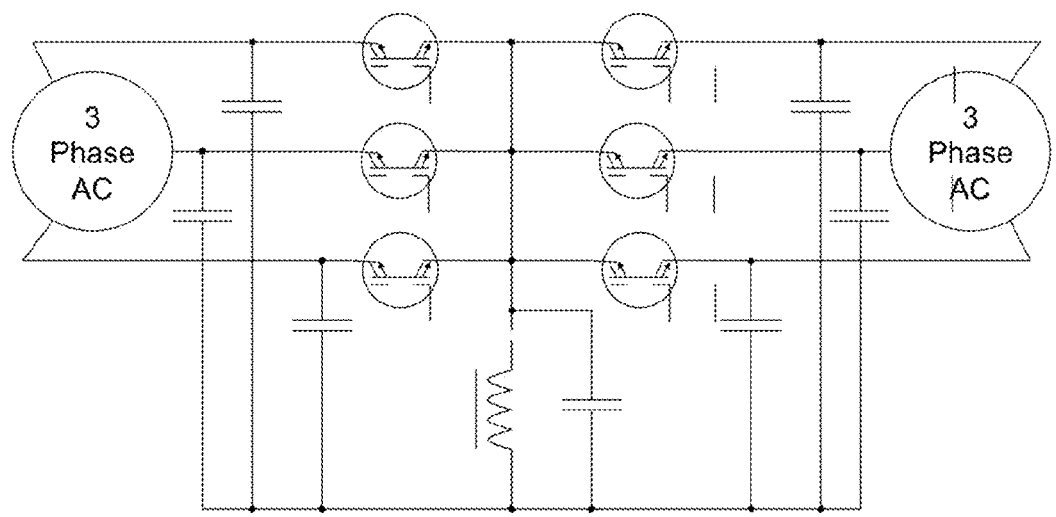
FIG. 3Z show a sample embodiment in a Half-Bridge Buck-Boost Converter in a Three Phase AC Topology with BCBS.
Figure 3A:
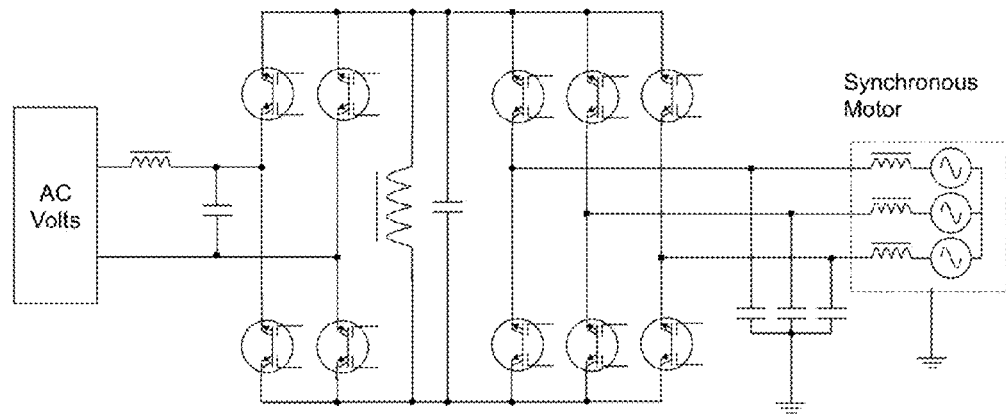
Figure 3B:
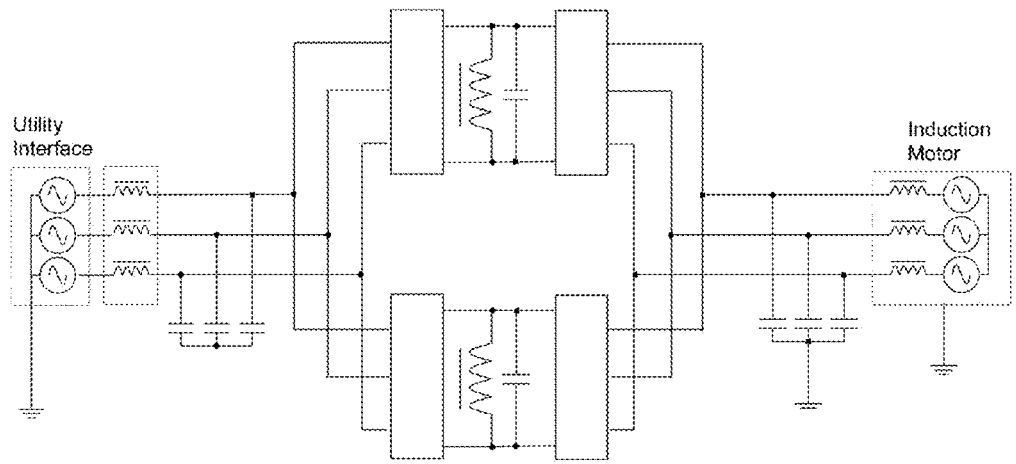
Figure 3C:
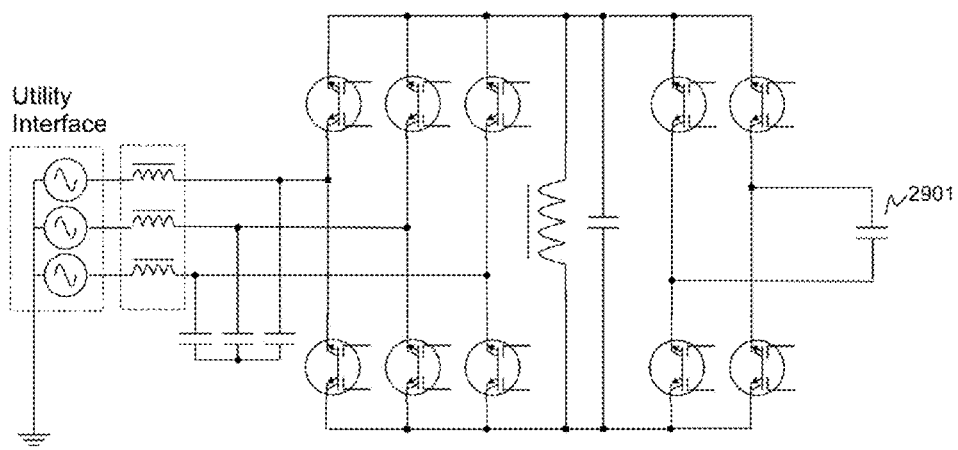
Figure 3D:
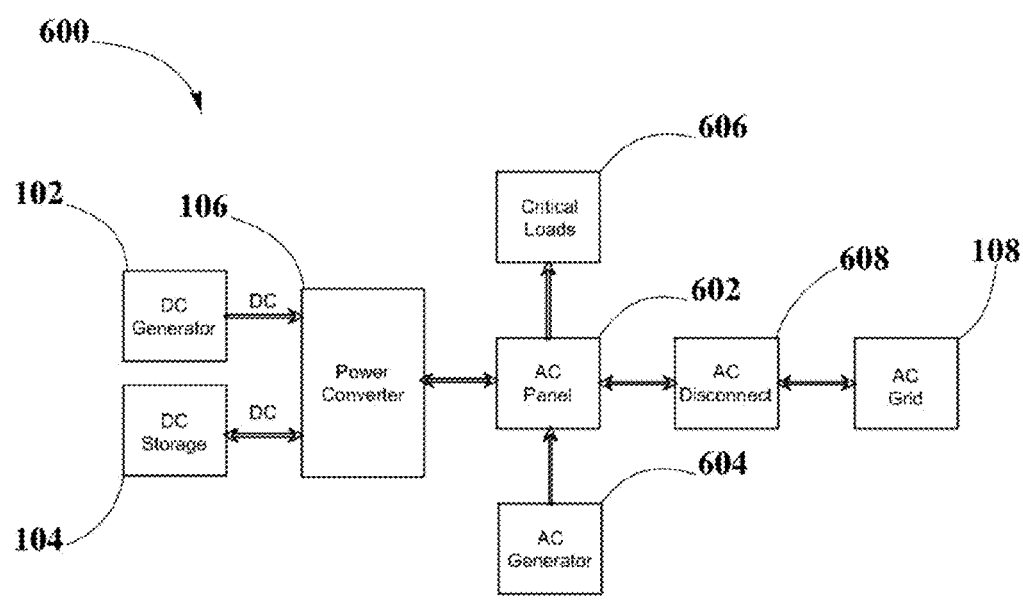
Figure 3E:
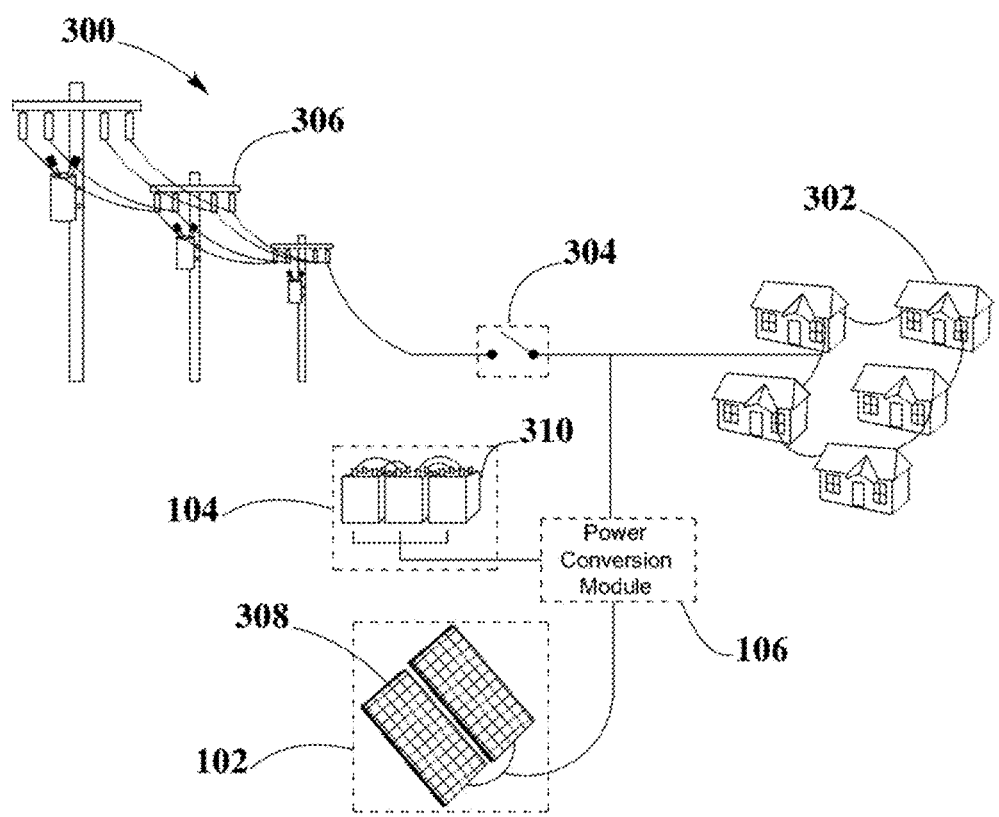

FIGS. 3Y and 3Z show half-bridge converter embodiments of the present inventions for single phase/DC and three phase AC applications, respectively. The half-bridge embodiment requires only 50% as many switches, but results in 50% of the power transfer capability, and gives a ripple current in the input and output filters which is about double that of the full bridge implementation for a given power level.

FIG. 3AA shows a sample embodiment as a single phase to three phase synchronous motor drive, as can be used for driving a household air-conditioner compressor at variable speed, with unity power factor and low harmonics input. Delivered power is pulsating at twice the input power frequency.

FIG. 3BB shows a sample embodiment with dual, parallel power modules, with each module constructed as per the converter of FIG. 3H, excluding the I/O filtering. This arrangement can be advantageously used whenever the converter drive requirements exceed that obtainable from a singe power module and/or when redundancy is desired for reliability reasons and/or to reduce I/O filter size, so as to reduce costs, losses, and to increase available bandwidth.

The power modules are best operated in a manner similar to multi-phase DC power supplies such that the link reactance frequencies are identical and the current pulses drawn and supplied to the input/output filters from each module are uniformly spaced in time. This provides for a more uniform current draw and supply, which can greatly reduce the per unit filtering requirement for the converter. For example, going from one to two power modules, operated with a phase difference of 90 degrees referenced to each of the modules inductor/capacitor, produces a similar RMS current in the I/O filter capacitors, while doubling the ripple frequency on those capacitors. This allows the same I/O filter capacitors to be used, but for twice the total power, so the per unit I/O filter capacitance is reduced by a factor of 2. More importantly, since the ripple voltage is reduced by a factor of 2, and the frequency doubled, the input line reactance requirement is reduced by 4, allowing the total line reactor mass to drop by 2, thereby reducing per unit line reactance requirement by a factor of 4.

FIG. 3CC shows a sample embodiment as a three phase Power Line Conditioner, in which role it can act as an Active Filter and/or supply or absorb reactive power to control the power factor on the utility lines. If a battery, with series inductor to smooth current flow, is placed in parallel with the output capacitor 2901, the converter can then operate as an Uninterruptible Power Supply (UPS).

FIG. 3A shows an example of a circuit implementing this architecture. In this example, one port is used for connection to the AC grid (or other three-phase power connection). The other is connected to a motor, to provide a variable-frequency drive.

In FIG. 3A, an LC link reactance is connected to two DC ports having two lines each, and to a three-phase AC port. Each line connects to a pair of bidirectional switches, such that one bidirectional switch connects the respective line to a rail at one side of the link reactance and the other bidirectional switch connects the line to a rail at the other side of the link reactance.

In one sample embodiment, voltage and current across a link reactance can be seen in, e.g., FIG. 3B. Link voltage waveform 1301 and link current waveform 1302 correspond to an arbitrary set of inputs and outputs. After a conduction interval begins and the relevant switches are activated, voltage 1301 on the link reactance remains almost constant during each mode interval, e.g. during each of modes 1-8. After an appropriate current level has been reached for the present conduction mode, as determined by the controller, the appropriate switches are turned off. This can correspond to, e.g., conduction gap 1303. The appropriate current level can be, e.g., one that can achieve the desired level of power transfer and current distribution among the input phases.

Current can now circulate between the link inductor and the link capacitor, which is included in the circuit to slow the rate of voltage change. This in turn greatly reduces the energy dissipated in each switch as it turns off. After the link voltage reaches appropriate levels for the next set of lines, the appropriate switches are enabled, and energy transfer between the port and the link continues with the next line pair.

A power converter according to some embodiments of this architecture can be controlled by, e.g., a Modbus serial interface, which can read and write to a set of registers in a field programmable gate array (FPGA). These registers can define, e.g., whether a port is presently an input, an output, or disabled. Power levels and operation modes can also be determined by these registers.

In some embodiments, a DC port preferably has one line pair, where each line pair is e.g. a pair of lines that can transfer energy to or from the link reactance through semiconductor switches. A three-phase AC port will always have three lines, and will often have a fourth (neutral), but only two are preferably used for any given power cycle (of the inductor).

Given three lines, there are three possible two-line combinations. For example, given lines A, B, and C, the line pairs will be A-B, B-C, and A-C.

Register values for each port can be used to determine the amount of charge, and then the amount of energy, to be transferred to or from each port during each conduction period. An interface then controls each port's switches appropriately to transfer the required charge between the link and the enabled ports.

A separate set of working registers can be used in some embodiments to control converter operations. Any value requiring a ramped rate of change can apply the rate of change to the working registers.

The mode set for a port during a given power cycle can determine what factor will drive the port's power level. This can be, for example, power, current, conductance, or net power. In "net power" mode, the port's power level can be set by, e.g., the sum of other port's power settings. The mode of at least one port will most preferably be set to net power in order to source or sink the power set by the other ports. If two ports are set as net power, the two ports will share the available power.

A main control state machine and its associated processes can control the transfer of power and charge between ports, as seen in FIG. 3C. The state machine can be controlled in turn by the contents of registers. The state machine transfers the amount of energy set by the interface from designated input ports to the link reactance, and then transfers the appropriate amount of energy from the link to designated output ports.

The Reset/Initialize state occurs upon a power reset, when converter firmware will perform self-tests to verify that the converter is functioning correctly and then prepare to start the converter. If no faults are found, the state machine proceeds to the Wait_Restart state.

The Wait_Restart state can be used to delay the start of the converter upon power up or the restart of the converter when certain faults occur. If a fault occurs, a bleed resistor is preferably engaged. Certain faults, once cleared, will preferably have a delay before restarting normal converter operation. The next state will be Startup.

When the Startup state begins, there is no energy in the link. This state will put enough energy into the link to resonate the link to the operational voltage levels, which are preferably greater than the highest voltage of any input line pair.

When starting from an AC port, the firmware will wait until a zero voltage crossing occurs on a line pair of the AC port. The firmware will then wait until the voltage increases to about 40 volts, then turn on the switches of the line pair for a short duration. This will put energy into the link and start the link resonating. The peak resonant voltage must be greater than the AC line pair for the next cycle. After the first energy transfer, more small energy transfers can be made to the link as the link voltage passes through the line pair voltage, increasing the link's resonant voltage until the link's peak voltage is equal to or greater than the first input line pair voltage. At this point, a normal power cycle is ready to start and the state will change to Power Cycle Start upon detection of a zero current crossing in the link.

In the Power Cycle Start state, the amount of charge and energy that will be transferred to or from the link and each port is determined at the start of a power cycle. This state begins on a link zero current crossing detection, so the link current will be zero at the start of the state. The link voltage will preferably be equal or greater than the highest input voltage.

The input and output line pairs that are not disabled is preferably sorted by their differential voltages from the highest voltage to the lowest voltage, where outputs are defined as having a negative voltage with respect to the start of the current power cycle. If the power factor of the AC port is not unity, one of the two line pairs of the AC port will switch between input and output for a portion of a 60 Hz waveform.

If a DC port's mode is set to have constant current or constant power, the constant current or power levels are converted to equivalent conductance values and used to adjust the relevant port's settings appropriately. If the port's mode is set to net power, the port will transfer the sum of all the energy of all other ports not in net power mode.

MPPT (Maximum Power Point Tracking) mode preferably constantly adjusts the charge put into the Link from a photovoltaic array to maximize transferred energy. There will typically be a maximum current draw after which voltage begins to decrease, where the particular maximal current depends on the photovoltaic array's output characteristics. This maximal current corresponds to maximum power, beyond which point energy transfer will decline. To determine this maximal point, energy transfer can be monitored while conductance is adjusted until a local maximum is found. There can be some variations in the amount of energy delivered, but this will tend to maximize energy transfer.

The charge Q to be transferred to the link can be found as, e.g., the product of conductance G, voltage V, and link power cycle period T (i.e. $Q=G*V*T$). The energy E to be transferred is then simply the product of the voltage times the charge ($E=V*Q=G*V^2*T$).

Since other port operation modes prescribe the energy to be transferred to or from the link, at least one port is most preferably in "net power" mode. This assures that at least one port is most preferably thus dependent on the energy in the link, rather than prescribing the same, so that the amount of energy put into the link equals the amount of energy taken out of the link.

The amount of energy that is put into the link by other modes is summed together to determine the energy transfer to or from ports operating in net power mode. A small amount of energy can in some cases be subtracted from this sum if extra energy is to be added to the link this cycle. If multiple ports are operating in net power mode, the available energy is preferably split between the two ports according to, e.g., the Modbus registers. The amount of charge to be transferred is preferably determined by the relationship charge=energy/voltage.

For an AC port, the phase angle between the voltage and current on the AC port can be varied, based on e.g. power factor settings. An AC port can also source reactive current for AC port filter capacitors to prevent the filter capacitors from causing a phase shift.

Three-phase charge calculations for a three-phase AC port can, in some embodiments, proceed as follows. Zero crossing of the AC voltage waveform for a first phase is detected when the voltage changes from a negative to positive. This can be defined as zero degrees, and a phase angle timer is reset by this zero crossing. The phase angle timer is preferably scaled by the measured period of the AC voltage to derive the instantaneous phase angle between the voltage of this first phase and the zero crossing. The instantaneous phase angle can then be used to read the appropriate sinusoidal scalar from a sinusoidal table for the first phase. The instantaneous phase angle can then be adjusted appropriately to determine the sinusoidal scalars for the second and third phases.

The instantaneous phase angle of the first phase can be decremented by e.g. 90° to read a reactive sinusoidal scalar for the first phase, and then adjusted again to determine reactive sinusoidal scalars for the other two phases.

The required RMS line current of the port can then be determined, but can differ dependent on, e.g., whether the port is in net power mode is controlled by conductance. In conductance mode, RMS line current can be found by, e.g., multiplying the conductance for the AC port by its RMS voltage.

In net power mode, RMS line current can be found e.g. as follows. The energy transferred to the link by all ports not in net power mode is first summed to determine the net power energy available. The small amount of energy defined by the link energy management algorithm can be subtracted from the available energy if relevant. The net energy available is multiplied by the percentage of total power to be allocated to the present port, which is 100% if only one port is in net power mode: Power=Σ Energy*port %.

Line RMS current can then be found by dividing the energy for the AC port by the RMS voltage of the port, the link power cycle period, and square root of 3: line current$_{rms}$=Power/(time$_{link\ cycle}$*voltage$_{rms}$√3).

The instantaneous in-phase current can then be calculated, and will again differ based on the operational mode of the port. In a conductance mode, the three line-to-line instantaneous voltages can be multiplied by the port conductance to determine the instantaneous current of each phase.

In net power mode, the sinusoidal scalar for each phase can be multiplied by the RMS line current to determine the instantaneous current of each phase. Alternately, voltages from an analog/digital converter can be used to find the instantaneous currents directly: Instantaneous Current=energy*$V_{a/d}$/(3*period*Vrms$^2$). The charge can then be found as Q=energy*$V_{a/d}$/(3*Vr$_{ms}^2$).

RMS line reactive current can then be found e.g. from power factor as follows:

Power Factor=Power/(Power+reactive power)

reactive power=(Power/power factor)−Power reactive power$_{line\ to\ line}$=Power/(3*power factor)−Power/3 rms reactive current$_{line}$=reactive power$_{line\ to\ line}$/rms voltage$_{line\ to\ line}$.

Filter capacitive current can then be calculated from the filter capacitance values, line to line voltage, and frequency. Capacitive compensation current can then be added to the RMS line reactive current to determine the total RMS line reactive current. Total RMS reactive current can then be multiplied by the reactive sinusoidal scalar to derive the instantaneous reactive current for each phase.

The instantaneous current and the instantaneous current for each phase can then be added together and multiplied by the period of the link power cycle to determine the amount of charge to be transferred for each phase.

The energy to transfer to or from the link can be found by multiplying the charge value of each phase by the instantaneous voltage and summing the energy of the three phases together.

The phase with the largest charge will be dominant phase for this cycle, and the two line pairs for the AC port will be between the dominant phase and each of the other two phases. The amount of charge to be transferred for each line pair is preferably the amount of charge calculated for the non-dominant line of the pair. The next state will be the Charge Transfer state.

In the Charge Transfer state, a first line pair is selected and the respective switches turned on. Even though the switches are on, no conduction will occur until the voltage of the link drops below that of an input line pair, or rises above the voltage of an output line pair where appropriate. If one end of the link inductor reaches the voltage of one line of the line pair, that end of the link inductor is indirectly anchored to the respective line. The link inductor will subsequently not change in voltage until the respective switch is turned off.

The voltage of the line pair is then compared to the integrated link voltage. It is generally assumed that current will begin to flow through the switches once the integrated link voltage reaches the voltage of the line pair, minus a switch voltage drop. This switch voltage drop is assumed to be on the order of e.g. 8 V for a pair of switches.

The amount of charge flowing into or out of the link is monitored. The charge can be found as Q=ΣIΔt, or the sum of the current times the time interval.

The link current is typically approximately zero at the start of a power cycle. The link current increases through the end of the last input, then decreases until reaching zero at the beginning of the next power cycle. The link current can be found as I=Σ($V_{instantaneous}$Δt/L), or the sum of the instantaneous voltage times the time interval divided by the inductance.

When the transferred charge is determined to have met the calculated amount for the given line pair, the state machine can progress to the next state. The next state can be Common Mode Management, or can be Idle. If the next state is Idle, all switches are turned off. In some sample embodiments, the state machine will only progress to the Common Mode Management state after the final output line pair.

The Common Mode Management state controls the common mode voltage of the link, as well as the energy left in the link following the prior state. To control the common mode voltage, one of the switches for the prior line pair is turned off, while the other switch is controlled by the Common Mode Management state. By having one switch on, the adjacent end of the link can be anchored at the respective line voltage. The voltage at the opposite end of the link can then increase until the current through the inductor drops to zero. The remaining switch can then be turned off. When a zero crossing is detected in the link current, the state machine will progress to the Idle state.

Two types of anchoring can be used in Common Mode Management. Direct anchoring occurs when one switch of a line pair is closed (turned on), which fixes the voltage of the nearest end of the link to the respective line voltage. While this switch is turned on, any change to the link's differential voltage will occur on the other end of the link, which will in turn change the link's common mode voltage.

Indirect anchoring occurs when both of a line pair's switches are turned on prior to a charge transfer. When the voltage of one end of the link is one switch-voltage-drop below the corresponding line voltage, the respective end of the link is anchored to that voltage. The voltage of the other end of the link will continue to change until the voltage across the link is equal to two switch-voltage-drops below the line pair voltage. At this point, charge transfer between the link and the line pair begins.

The Common Mode Management state also controls the energy left in the link after output charge transfer is completed, or after ramp-up. After the last output charge transfer, enough energy will most preferably remain in the link to have completed the last output charge transfer, and to cause the link voltages first to span, and then to decrease to just below, the voltages of the first input line pair. This can permit zero-voltage switching of the input switches. Zero-voltage switching, in turn, can reduce switching losses and switch overstressing. The voltages across the switches when conduction begins can preferably be e.g. 4 V, but is most preferably no more than 20 V. If insufficient energy remains in the link to permit zero-voltage switching, a small amount of power can be transferred from one or more ports in net power mode to the link during the subsequent power cycle.

FIG. 3D shows a sample embodiment in which the voltages of the last output span the voltages of the first input. It can be seen that the link-energy requirements have been met, though small amounts of energy can occasionally be needed to account for link losses.

FIG. 3E shows another sample embodiment in which the voltages of the last output are spanned by the voltages of the first input. Enough energy must be maintained in the link to resonate the link voltages to above the voltages of the first input. Additional energy can sometimes be needed to account for small link losses, but the link-energy requirements can be met fairly easily.

FIG. 3F shows a third sample embodiment, in which the voltages of the last output neither span nor are spanned by the voltages of the first input. Since the last output voltages do not span the first input voltages, the link voltage will need to be increased. Enough energy in the link needs to be maintained in the link to resonate the link voltages above the voltages of the first input pair before the link current crosses zero. This can in some sample embodiments require small amounts of additional energy to fulfill this requirement.

In each of the sample embodiments of FIGS. 3D-3F, the common mode voltage of the link will preferably be forced toward the common mode voltage of the first input. The switch of the last output furthest in voltage from the common mode voltage will preferably be turned off first. The link will thus first anchor to the end with a voltage closest to that desired while the other end changes. The other switch is preferably turned off either once the common mode voltage of the first input is turned off or else a zero-crossing is detected in the link current.

The Idle State most preferably ensures that all link switches remain for a period of time immediately after a switch is turned off. As switches do not turn off instantaneously, this can be used to minimize cross-conduction between lines, which can occur when one switch is turned on before another has time to completely turn off. In some sample embodiments in which the switches comprise e.g. IGBTs, the time between nominal and actual turn-off of the switches can be significant. After the requisite time has elapsed, the state machine can advance to the next state. If the prior state was the last line pair, the next state is preferably the Power Cycle Start state, and is otherwise preferably the Charge Transfer state.

In one sample embodiment, the bidirectional switches can comprise, e.g., two series IGBTs and two parallel diodes, as in FIG. 3G. In an embodiment like that of FIG. 3G, a bidirectional switch can have two control signals, each controlling one direction of current flow. Other bidirectional switches are also possible.

Switch control signals are most preferably monitored to prevent combinations of switches being turned which can lead to catastrophic failures of the converter. Only switches corresponding to a single line pair will preferably be enabled at a time. As relatively few possible switch combinations will prevent catastrophic failure, monitoring can look for the few permissible combinations to allow instead of looking for the many combinations to forbid.

Switch control signals can preferably also be monitored to avoid turning new switches on too quickly after another switch has been turned off. The switches take a finite time to turn off, and turning on another switch too quickly can cause damaging cross-conduction.

Voltage across each switch is also preferably monitored before it is turned on to avoid damaging overvoltage.

Zero-crossings in the link current are preferably detected e.g. using a toroid installed on a link cable. Instead of directly measuring link current, it can be calculated by integrating the voltage across the link and scaling the result. This calculated current can preferably be reset every time a zero-crossing is detected, to prevent long-term accumulation of error. Zero-crossings, when detected, can also be used to set the link polarity flag, as the voltage across the link reverses when the direction of current flow changes.

In some sample embodiments, power converter voltages can be measured with high-speed serial analog-to-digital (A/D) converters. In one sample embodiment, these converters can have e.g. a 3 MSPS (mega-samples per second) conversion rate. In one sample embodiment, the converters can take e.g. 14 clocks to start a conversion and clock in the serial data, leading to e.g. a data latency of 0.3 μs. One sample embodiment can use e.g. 22 such A/D converters.

Islanding occurs when a converter continues to output power when the AC power grid goes down. This can be extremely dangerous, especially for line crews attempting to fix the AC power grid. Islanding conditions are most preferably detected and used to trigger a shutdown of the converter's AC output.

Preferably ground fault detection is used on the DC inputs. When DC contactors are closed, the voltage drop between the common connection of a port's connectors and the DC port's ground connection will preferably be measured. If this voltage is over a certain limit, either too much ground current is present or else the port's ground fuse is blown. Both of these situations will generate a fault.

A fault will preferably be generated if toroids on input cables detect surges.

Each DC port will preferably have a pair of contactors connecting positive and negative power sources to an input ground connection. Configuration information is preferably read from the registers and used to open or close the contactors as needed. Before contactors are closed, DC filter capacitors are preferably pre-charged to the voltage on the line side of the contactors in order to prevent high-current surges across the contacts of the contactors.

An LCD or other type of screen is preferably provided as an interface to a power converter.

The temperature of a heat sink is preferably monitored and used to direct fans. Tachometers on the fans can preferably be monitored, and the information used to shut down fan control lines if a fan fails. As these temperature sensors can occasionally give incorrect information, in some sample embodiments e.g. two preceding readings can be compared against the current temperature reading, and e.g. the median value can be chosen as the current valid temperature.

In some sample embodiments, a processor can be used to control a power converter. This can be e.g. a NIOS processor which is instantiated in the field-programmable gate array.

In some sample embodiments, an interface to e.g. a 1 GB flash RAM can be used. In one sample embodiment, a flash RAM can have e.g. a 16-bit-wide bus and e.g. a 25-bit address bus. In some sample embodiments, an active serial memory interface can permit reading from, writing to, or erasing data from a serial configuration flash memory.

In some sample embodiments, a field-programmable gate array can be connected to e.g. a 1 MB serial nvSRAM with real time clock.

In some sample embodiments, dual row headers on a pc board can be used e.g. for testing and debugging purposes.

In some sample embodiments, LEDs or other indicators can be present on a control board. These indicators can be used e.g. for diagnostic purposes.

To minimize risks of condensation or other types of moisture damaging electronics, a power converter can preferably be kept in a sealed compartment. Some air flow is often necessary, however, due to e.g. temperature changes over time. Any air flowing into or out of the converter most preferably passes through one or more dehumidifiers. If left alone, the dehumidifiers eventually saturate and become useless or worse. Instead, heating elements can preferably be included with dehumidifiers to drive out accumulated moisture. When air flows into the otherwise-sealed compartment, dehumidifiers can remove moisture. When air flows out of the compartment, the heating elements can activate, so that ejected moisture is carried away with the outflowing air instead of continuing into the converter.

FIGS. 3DD and 3EE show two sample embodiments of bi-directional multi-port power conversion systems. In this sample embodiment, first input port 102 can include a power generator 202 connected to wind turbines 204, second input port 104 can include DC port for energy storage, and output port 108 can include an AC power grid.

According to one sample embodiment, generator 202 connected to wind turbines 204 can produce asynchronous AC, this asynchronous AC from generator 202 can be transformed to synchronous AC by power conversion module 106, and subsequently stored in second input port 104.

The present application discloses new approaches to power conversion and related applications. An energy storage leg, including a capacitor plus switching which connects the capacitor reversibly across a primary link reactance, can be added to at least one port of a power converter. Preferably the power converter has an architecture, such as that of the "Universal Power Converter," which is functional even without the energy storage leg.

Some exemplary parameters will be given to illustrate the relations between these and other parameters. However it will be understood by a person of ordinary skill in the art that these values are merely illustrative, and will be modified by scaling of further device generations, and will be further modified to adapt to different materials or architectures if used.

This application teaches inter alia improvements on the concepts described in U.S. Pat. No. 7,599,196 and in U.S. Pat. No. 7,778,045. These patents describe many key concepts, and many other implementations, of the Universal Power Converter. Each of these applications has copendency, common inventorship, and common ownership with the present application. Each of these applications is hereby incorporated by reference in its entirety.

The present invention relates to single-phase to three-phase conversion for three-phase motor drives, and also to three-phase to single-phase conversion.

Single-phase power converters disclosed herein are typically more efficient and cost-effective than other power converter devices.

In single-phase to three-phase conversion, single-phase input is transferred with unity power factor and low harmonics to a variable voltage and frequency output to drive an induction motor at variable speeds, and can be used, for example, to minimize the power consumption of an AC unit.

In preferred embodiments, an UPC (Universal Power Converter) topology is described, in which the UPC has multi-port capability to avoid the use of electrolytic capacitors in single phase power converters. This also allows a single UPC to accomplish low harmonic single phase to three phase operations.

Some embodiments comprise single-phase to three-phase conversion methods for variable speed residential AC applications. A charging and discharging energy storage capacitor process can use a series of cycles. In the charging process, a motor drive receives full three-phase power while an energy storage capacitor is charged and when single-phase input is at maximum voltage. In the discharging process, a motor drive receives full three-phase power, and the Energy Storage Capacitor (ESC) is discharged, when single-phase input is at zero or low voltage.

In some embodiments, cost-effective and reliable single-phase power converters can support three-phase motor drives with high workload performance, and assure an effective match of motor and drive for obtaining optimal torque, speed and efficiency.

Figure 1:
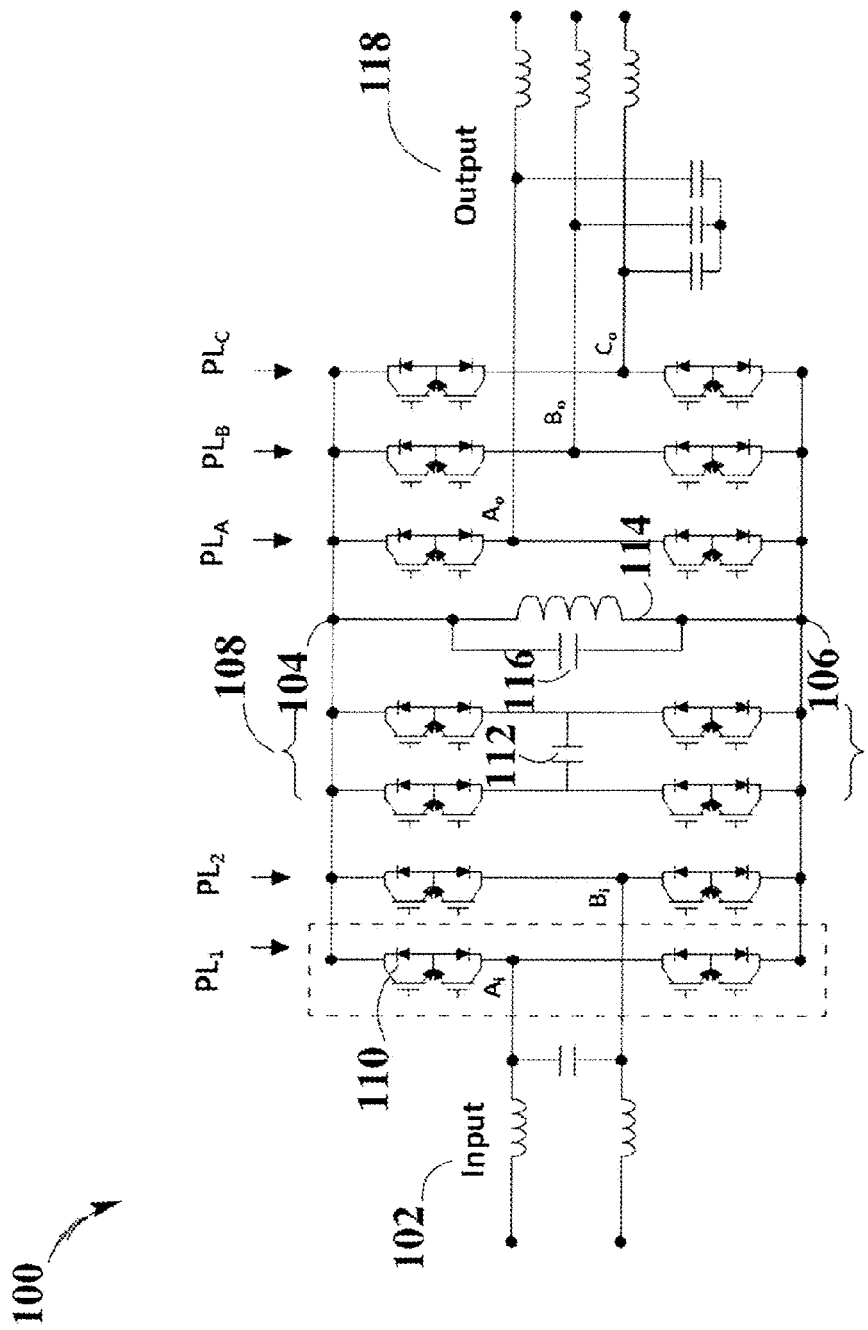
FIG. 1 shows one sample embodiment of a modified Universal Power Converter circuit configuration, which includes an energy storage capacitor with a bridge circuit to provide a "pseudo-phase".

FIG. 1 shows a first example 100 of the innovative pseudo-phase UPC circuit topology. The two lines $A_i$ and $B_i$ of a single-phase input 102 are connected into respective phase legs PL.sub.1 and PL.sub.2, both of which are connected to a common pair of lines 104/106.

Note that an energy storage section 108 has been added to the UPC in order to buffer energy transfers involving a single phase AC power source or sink. In this example, the energy storage section 108 includes four AC (bi-directional) switches 110 which allow power transfer to or from a connected energy storage capacitor 112 (ESC). This power transfer can occur in either direction between the capacitor ESC 112 and the link inductor 114, or in either direction between the capacitor ESC 112 and an external port.

The link inductor 114 (with its shunt capacitor 116) is directly connected to the lines 104/106, but all other components are connected only through switches 110. Thus the link inductor 114 can be completely isolated by disconnecting all the other components from the common lines 104/106.

Passive components are used for filtering on the input 102 and output 118 connections, but other configurations besides that shown can be used.

The common lines 104/106 connect the link inductor 114 to the input port 102 and to the energy storage section 108, but also to an output port 118. In this example three phase legs PL.sub.A, PL.sub.B, and PL.sub.C are used to drive three output lines A.sub.0, B.sub.0, and C.sub.0 as described below.

Thus, when the single phase AC input 102 (on the two terminals at the left side of this drawing) is at or near maximum voltage, power is transferred on each cycle of the link inductor (or link reactance) 114, from the AC input 102 to both the three phase output 118 and the energy storage capacitor 112. When the single phase AC input 102 is at or near zero voltage, all output power comes from the energy storage capacitor ESC 112. At some intermediate AC input voltage, power transfer is only between the input 102 and the three phase output 118.

The disclosed inventions take advantage of the multi-port capability of the UPC to avoid the use of electrolytic capacitors in single phase power converters, and also allows a single UPC to accomplish low harmonic single phase to three phase operations.

The disclosed inventions can also be used to accomplish DC to single phase conversion, single phase to DC conversion, or single phase to single phase conversion with or without frequency conversion, all without the use of electrolytic capacitors.

In one sample embodiment, to minimize the size of the film capacitor used for the energy storage capacitor 112, the voltage on the energy storage capacitor 112 is made to vary over an almost 2 to 1 voltage range, taking advantage of the buck-boost capability of the UPC.

Single Phase to Multi-Phase

Single phase to three phase conversion is of particular value in, for example, residential variable speed AC applications, in which the single phase input is transferred, with unity power factor and low harmonics, to a variable voltage and frequency output to drive an induction motor at variable speeds. This can be used to minimize the power consumption of an AC unit.

Figure 2:
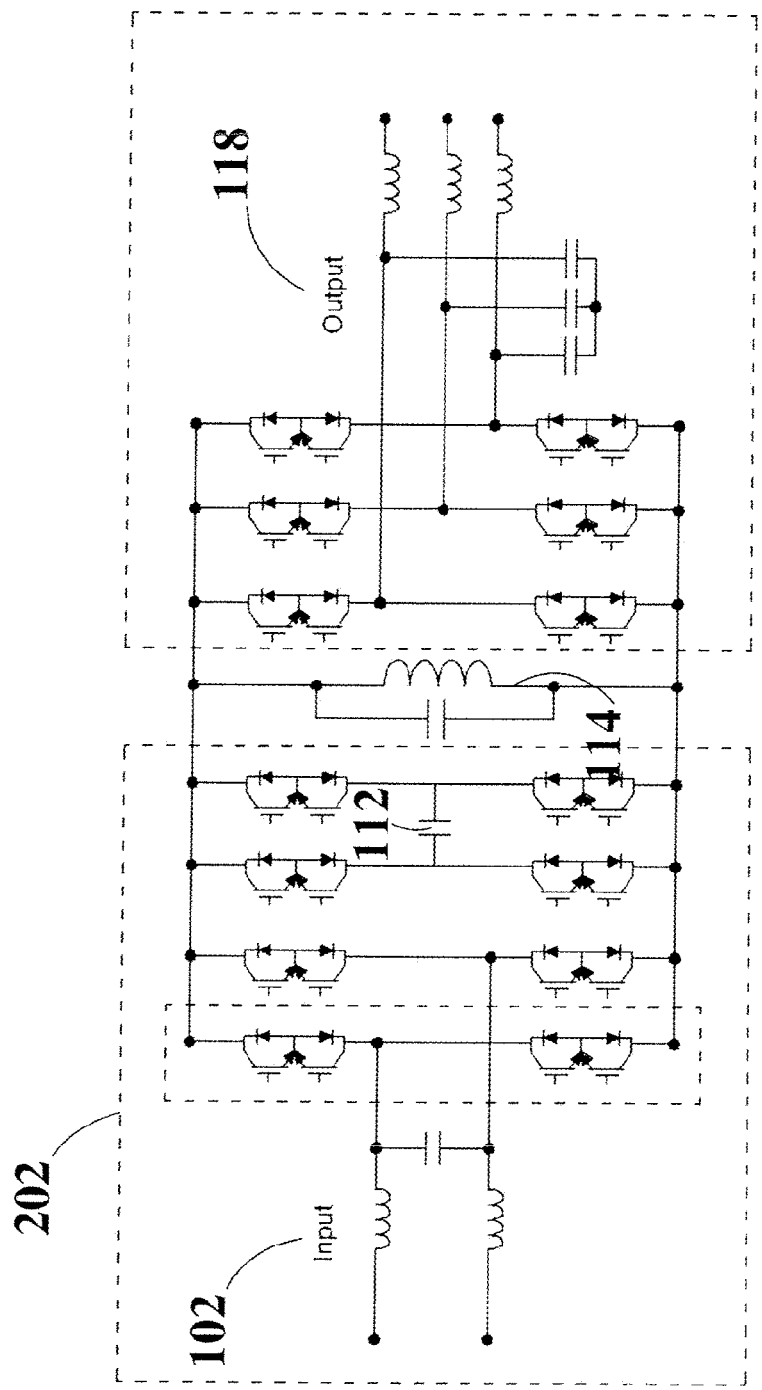
FIG. 2 shows one sample embodiment of a modified Universal Power Converter circuit configuration, which includes an energy storage capacitor with a bridge circuit to provide a "pseudo-phase".

FIG. 2 schematically shows a modified Universal Power Converter circuit configuration, which includes an energy storage capacitor 112 with a full-bridge configuration. This configuration can be used, for example, to minimize the power consumption of a residential AC unit. As shown in FIG. 2, single-phase input 102 can be transferred with unity power factor and low harmonics to a variable voltage and frequency three-phase output 118 to drive an induction motor at variable speeds.

Charging: In one sample embodiment, when the Single Phase line 102 is at maximum voltage, the energy storage capacitor (ESC) 112 can be charged while full three phase power is provided to the motor 118, as follows:

1. The link inductor LI 114 charges to full current from the single phase input line 102 (at max voltage).
2. The link inductor 114 disconnects from the input side 202 and undergoes voltage reversal.
3. The link inductor 114 discharges some energy into the lowest voltage phase pair of the motor 118 (and therefore the current on the Link Inductor 114 drops).
4. The link inductor 114 disconnects from that lowest voltage phase pair, and then (as an isolated inductor with stored energy) its voltage ramps up.
5. When the link inductor's 114 voltage exceeds that of the highest voltage phase pair of the motor 118, the link inductor 114 is connected to discharge more energy into the highest voltage phase pair.
6. The link inductor 114 is then disconnected from the highest voltage phase pair, and then (as an isolated inductor with stored energy) its voltage ramps up again.
7. When the voltage on the link inductor 114 ramps up to the voltage on the energy storage capacitor ESC 112, the link inductor 114 is connected to discharge its remaining energy into the energy storage capacitor ESC 112.
8. The above cycle 1-7 is repeated, but with reversed current on the link inductor 114.

Discharging: In one sample embodiment, when the Single Phase line is at zero or low voltage, the energy storage capacitor (ESC) can be discharged while full three phase power is provided to the motor, as follows:

1. The link inductor 114 charges to a suitable current from the energy storage capacitor ESC 112.
2. The link inductor 114 is disconnected from the Energy Storage Capacitor 112, and its voltage ramps down to that of the single phase line 102.
3. The link inductor 114 is then connected to be charged to higher current from the single phase line input 102.
4. The link inductor 114 is then disconnected from the input 202, and undergoes voltage reversal.
5. The link inductor 114 discharges some energy into lowest voltage phase pair of the output motor, and hence the current on link inductor 114 drops.
6. The link inductor 114 is then disconnected from the lowest voltage phase pair, and its voltage then ramps up to highest voltage phase pair of motor.
7. The link inductor 114 is then connected to discharge its remaining energy into the highest voltage phase pair.
8. The above cycle 1-7 is repeated, but with reversed current through the link inductor 114.

This use of the energy storage section shows why the converters using it are referred to as "pseudo-phase" converters. In general, the energy storage section can provide energy storage with a flexibility of timing. This can provide great synergistic advantages in combination with the Universal Power Converter topology.

Figure 4:
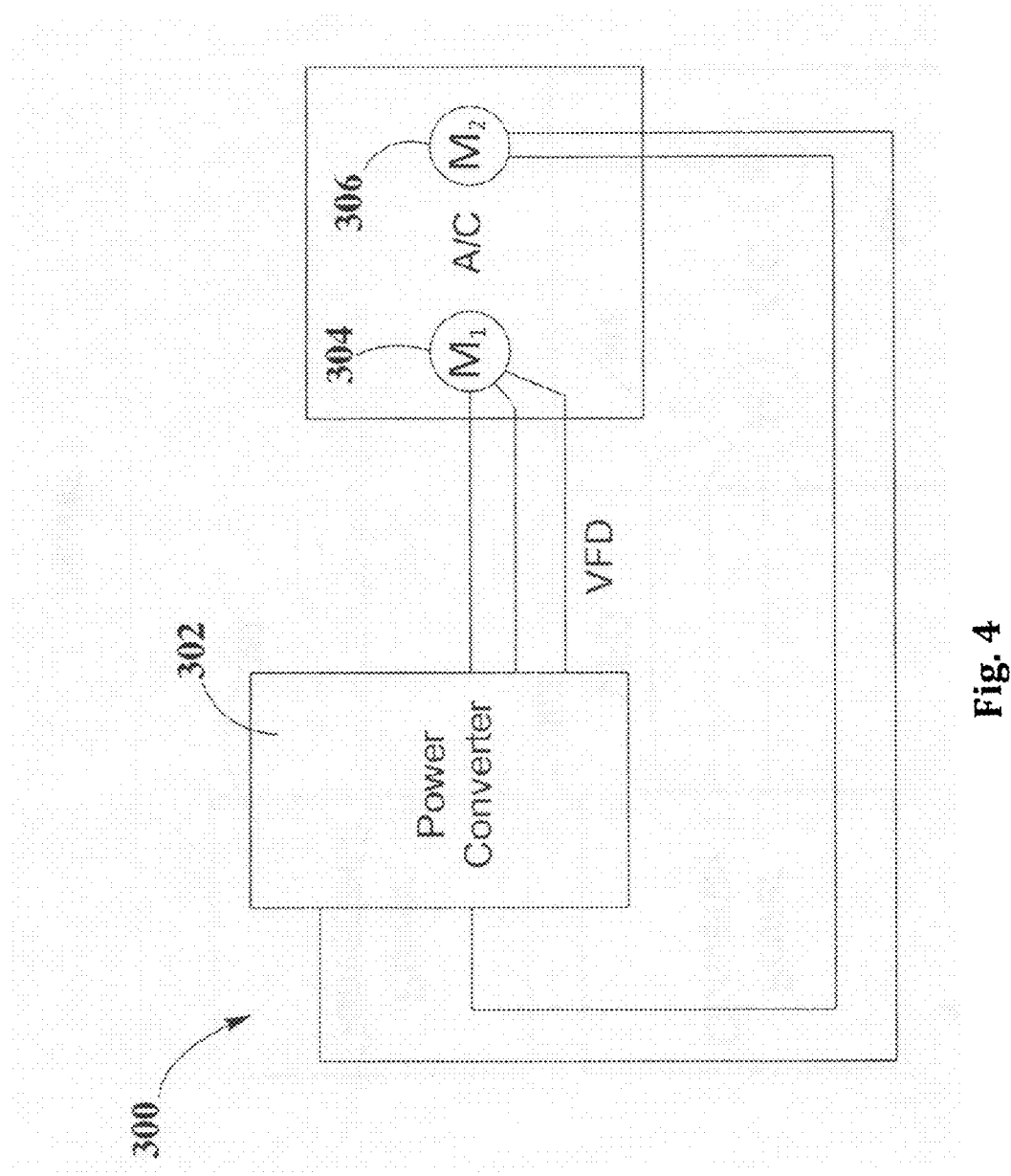
FIG. 4 shows one sample embodiment of a system in which a pseudo-phase power converter provides a Variable Frequency Drive output to an appliance (in this example the compressor motor of an air conditioner), in an environment where three-phase power is not available.

FIGS. 3 and 4 show examples 300 and 400, respectively, of systems incorporating conversion of this type. In these sample embodiments, a residential air conditioning unit is driven with variable frequency, by use of a pseudo-phase converter 302 to generate a variable-frequency three-phase output.

In a sample embodiment like that of FIG. 4, the power compressor motor M1 304 is driven with three-phase, and the blower motor M2 306 is driven with the normal 120/240V single phase (or split-phase line).

Figure 5:
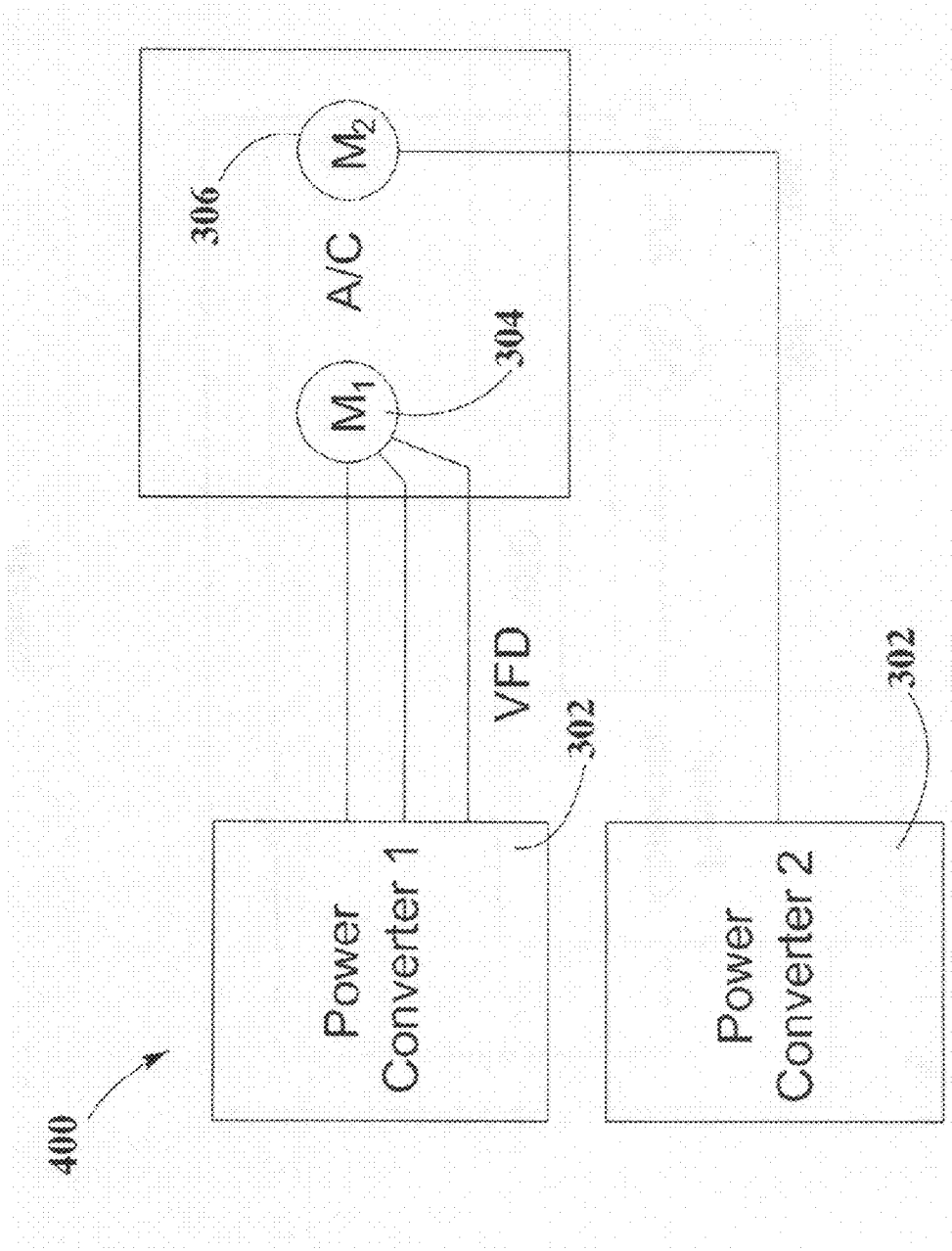
FIG. 5 shows one sample embodiment of a system in which a pseudo-phase power converter provides a Variable Frequency Drive output to an appliance (in this example the compressor motor of an air conditioner), in an environment where three-phase power is not available.

As shown in FIG. 5, two power converters 302 can be used to provide independently controlled variable-speed outputs to both the compressor motor M1 304 and the blower motor M2 306. In a sample embodiment like that of FIG. 5, one power converter 302 drives the compressor motor M1 304 with three-phase, and another power converter 302 drives the blower motor M2 306 with the normal 120/240V single phase (or split-phase line).

Multiphase to Single-Phase

Figure 6:
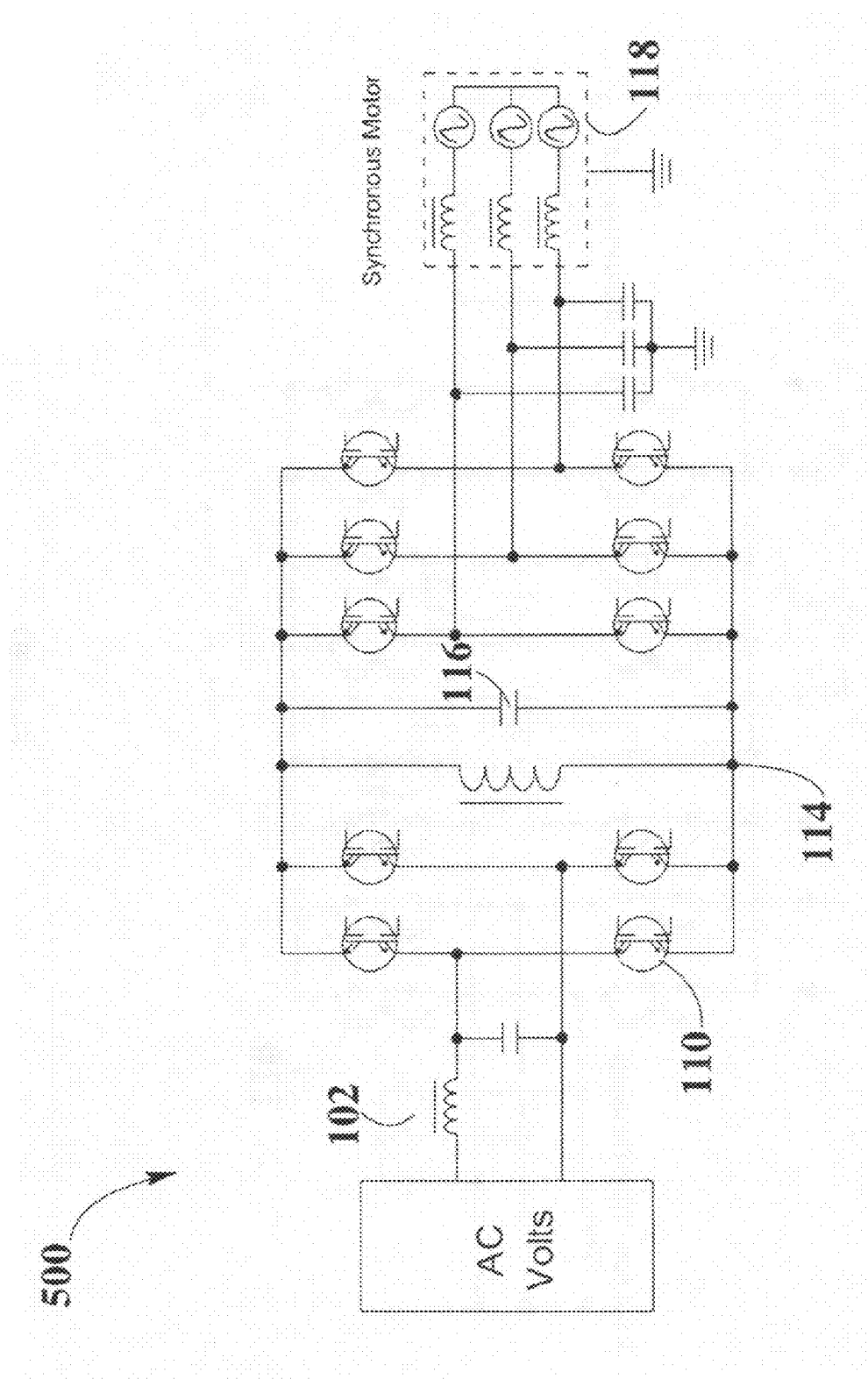
FIG. 6 shows one sample embodiment which provides a single phase to three phase synchronous motor drive.

FIG. 6 shows a sample embodiment 500 of a single phase to three phase synchronous motor drive 118. Synchronous motor drive 118 can be used for driving a household air-conditioner compressor at variable speed, with unity power factor and low harmonics input. Delivered power pulsates at twice the input power frequency.

Figure 7:
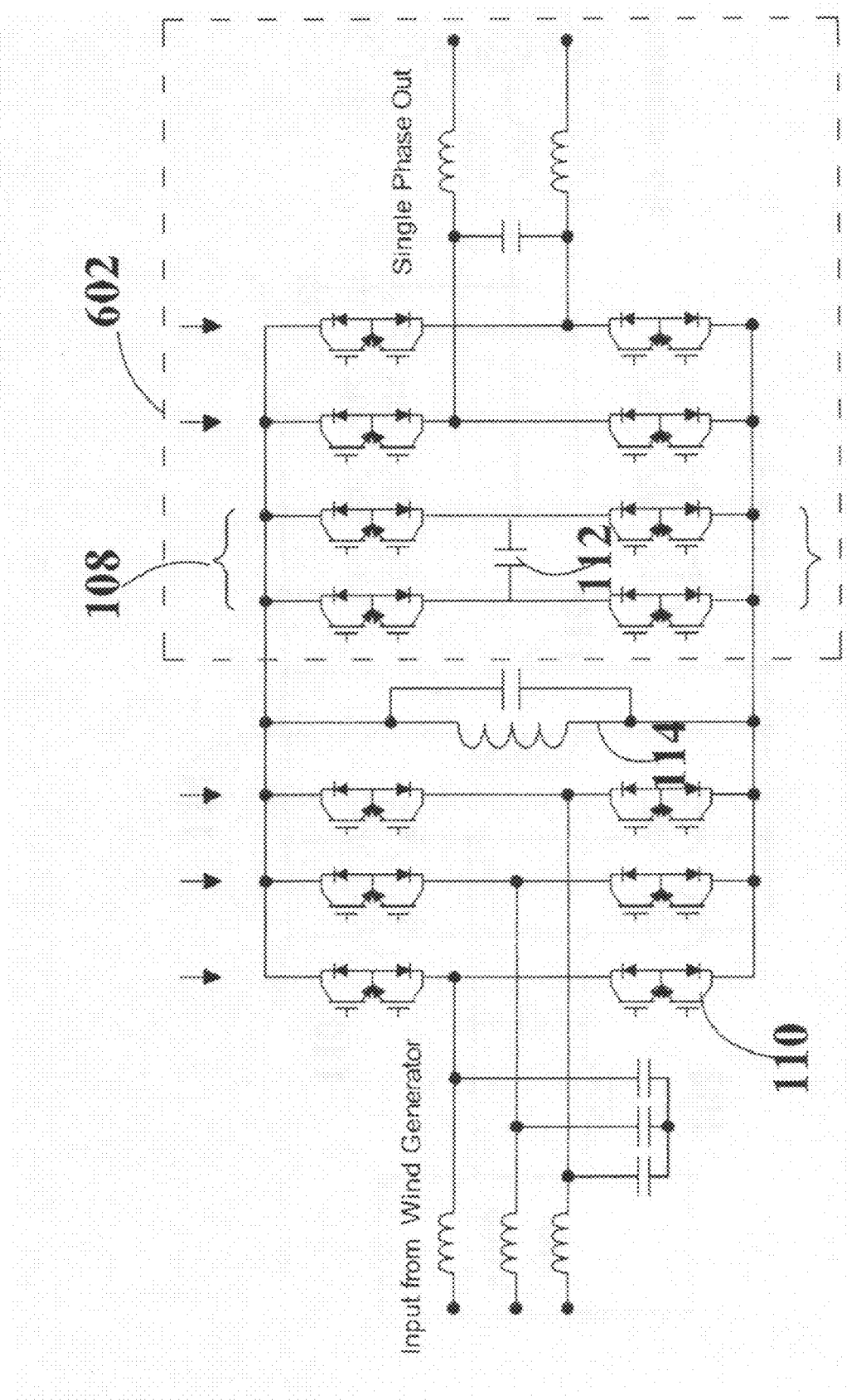
FIG. 7 shows one sample embodiment of a system in which a pseudo-phase power converter converts power from a wind-driven alternator to provide residential (or other) power supply at standard voltage and frequency.

FIG. 7 shows a sample embodiment of a system configuration which can be particularly useful. With wind-powered electricity generation the available power is inherently variable, and (depending on the electrical configuration used) may result in an AC power output which has variable frequency and/or variable voltage. In one sample embodiment, the power from the wind power source is three-phase, with an unpredictable frequency which is typically in the range of e.g. 20-80 Hz (depending on conditions). The pseudo-phase converter 100 can be used to translate this power into standard voltage and frequency, and (if desired) to lock the phase precisely to the local power grid. An energy storage capacitor (ESC) 112 is included, located at the output side 602, with a full-bridge configuration.

According to some but not necessarily all embodiments, there is provided: A power converter for powering an application requiring both single phase and three phase power, comprising: first and second single phase power portals and a three phase power portal; a first power module, comprising: a first energy-transfer reactance; and first and second bridge switch arrays interposed between said reactance, and said single phase power portals, respectively, and each comprising one bidirectional switching device for each port of said single phase power portals; and a second power module, comprising: a second energy-transfer reactance; third and fourth bridge switch arrays interposed between said reactance, and said second single phase and three phase power portals, respectively, and each comprising one bidirectional switching device for each port of said second single phase and three phase power portals; and an energy storage capacitor, reversibly connected across said second reactance through a full-bridge configuration.

According to some but not necessarily all embodiments, there is provided: A power converter, comprising: first and second single phase or three phase power portals, said power portals having different numbers of phases; an energy-transfer reactance; first and second bridge switch arrays interposed between said reactance, and said power portals, respectively, and each comprising one bidirectional switching device for each port of said power portals; and an energy storage capacitor, reversibly connected across said second reactance through a full-bridge configuration; wherein the power converter does not comprise electrolytic capacitative components.

According to some but not necessarily all embodiments, there is provided: A power converter, comprising: a single phase AC power portal and a three phase synchronous motor drive power portal; an energy-transfer reactance; and first and second bridge switch arrays interposed between said reactance, and said power portals, respectively, and each comprising one bidirectional switching device for each port of said power portals; and a controller which is connected to operate said bridge switch arrays, with mutually exclusive conduction intervals between respective first and second ones of said bridge switch arrays, to drive current through said reactance in both directions during each cycle, and to deliver power pulsating at twice the input power frequency to said motor drive power portal.

According to some but not necessarily all embodiments, there is provided: Methods and systems for power conversion. An energy storage capacitor is contained within an H-bridge subcircuit which allows the capacitor to be connected to the link inductor of a Universal Power Converter with reversible polarity. This provides a "pseudo-phase" drive capability which expands the capabilities of the converter to compensate for zero-crossings in a single-phase power supply. Conversion between, e.g., single phase and three phase power is enabled, in either direction, without sacrificing workload performance.

According to some but not necessarily all embodiments, there is provided: A power converter for powering an application requiring both single phase and three phase power, comprising: first and second single phase power portals and a three phase power portal; a first power module, comprising: a first energy-transfer reactance; and first and second bridge switch arrays interposed between said reactance, and said single phase power portals, respectively, and each comprising one bidirectional switching device for each port of said single phase power portals; and a second power module, comprising: a second energy-transfer reactance; third and fourth bridge switch arrays interposed between said reactance, and said second single phase and three phase power portals, respectively, and each comprising one bidirectional switching device for each port of said second single phase and three phase power portals; and an energy storage capacitor, reversibly connected across said second reactance through a full-bridge configuration.

According to some but not necessarily all embodiments, there is provided: A power converter, comprising: first and second single phase or three phase power portals, said power portals having different numbers of phases; an energy-transfer reactance; first and second bridge switch arrays interposed between said reactance, and said power portals, respectively, and each comprising one bidirectional switching device for each port of said power portals; and an energy storage capacitor, reversibly connected across said second reactance through a full-bridge configuration; wherein the power converter does not comprise electrolytic capacitative components.

According to some but not necessarily all embodiments, there is provided: A power converter, comprising: a single phase AC power portal and a three phase synchronous motor drive power portal; an energy-transfer reactance; and first and second bridge switch arrays interposed between said reactance, and said power portals, respectively, and each comprising one bidirectional switching device for each port of said power portals; and a controller which is connected to operate said bridge switch arrays, with mutually exclusive conduction intervals between respective first and second ones of said bridge switch arrays, to drive current through said reactance in both directions during each cycle, and to deliver power pulsating at twice the input power frequency to said motor drive power portal.

According to some but not necessarily all embodiments, there is provided: A cooling appliance, comprising: a power-packet-switching power converter, connected to be powered from an external power connection; a compressor motor, electrically connected to be driven at variable frequency by said converter, using at least three lines; and a fan motor, electrically connected to be driven by a single-phase output from said converter.

According to some but not necessarily all embodiments, there is provided: An electrical appliance, comprising, in a single chassis: a power-packet-switching power converter, connected to be powered from an external power connection; a first motor, electrically connected to be driven at variable frequency by said converter, using at least three lines; and a second motor, electrically connected to be driven by a single-phase output from said converter; wherein said first motor has higher horsepower than said second motor.

According to some but not necessarily all embodiments, there is provided: Methods and systems for power conversion. An energy storage capacitor is contained within an H-bridge subcircuit which allows the capacitor to be connected to the link inductor of a Universal Power Converter with reversible polarity. This provides a "pseudo-phase" drive capability which expands the capabilities of the converter to compensate for zero-crossings in a single-phase power supply. Conversion between, e.g., single phase and three phase power is enabled, in either direction, without sacrificing workload performance.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

In presently-preferred embodiments, the sizing of the energy storage capacitors is independent of the sizing of the link inductor. In one sample embodiment, typically 25% to about 50% of total energy transferred goes through the ESC, but this percentage can vary significantly depending on the application.

In general it is only necessary to have one energy storage capacitor in the circuit. However, it is also possible (less preferably) to have more than one energy storage capacitor.

In one alternative class of embodiments, the power-packet-switching converter can also provide a variable voltage to the fan. It is also possible to provide a variable-speed three-phase output to the fan if desired.

Note that the converter, in this system, can also be configured to provide VFD plus single-phase drive outputs from a single-phase or split-phase power connection.

In a multiport system, it is usually most efficient to locate the energy-storage capacitor on the highest-voltage port of the system. However, this can be varied.

It will be apparent to one of ordinary skill in the art that, though particular single-phase, three phase, and mixed phase applications have been described hereinabove, the embodiments described herein can be applied to a wide variety of single-phase, three phase, mixed phase, and other power input and output requirement applications.

Additional general background, which helps to show variations and implementations, may be found in the following publications, all of which are hereby incorporated by reference: U.S. Pat. No. 5,969,957; U.S. Pat. No. 4,777,421.

Additional general background, which helps to show variations and implementations, as well as some features which can be implemented synergistically with the inventions claimed below, may be found in the following US patent applications. All of these applications have at least some common ownership, copendency, and inventorship with the present application, and all of them, as well as any material directly or indirectly incorporated within them, are hereby incorporated by reference: U.S. Pat. No. 8,406,265, U.S. Pat. No. 8,400,800, U.S. Pat. No. 8,395,910, U.S. Pat. No. 8,391,033, U.S. Pat. No. 8,345,452, U.S. Pat. No. 8,300,426, U.S. Pat. No. 8,295,069, U.S. Pat. No. 7,778,045, U.S. Pat. No. 7,599,196, US 2012-0279567 A1, US 2012-0268975 A1, US 2012-0274138 A1, US 2013-0038129 A1, US 2012-0051100 A1; US Provisionals 61/765,098, 61/765,099, 61/765,100, 61/765,102, 61/765,104, 61/765,107, 61/765,110, 61/765,112, 61/765,114, 61/765,116, 61/765,118, 61/765,119, 61/765,122, 61/765,123, 61/765,126, 61/765,129, 61/765,131, 61/765,132, 61/765,137, 61/765,139, 61/765,144, 61/765,146 all filed Feb. 15, 2013; 61/778,648, 61/778,661, 61/778,680, 61/784,001 all filed Mar. 13, 2013; 61/814,993 filed Apr. 23, 2013; 61/817,012, 61/817,019, 61/817,092 filed Apr. 29, 2013; 61/838,578 filed Jun. 24, 2013; 61/841,618, 61/841,621, 61/841,624 all filed Jul. 1, 2013; 61/914,491 and 61/914,538 filed Dec. 11, 2013; 61/924,884 filed Jan. 8, 2014; 61/925,311 filed Jan. 9, 2014; 61/928,133 filed Jan. 16, 2014; 61/928,644 filed Jan. 17, 2014; 61/929,731 and 61/929,874 filed Jan. 21, 2014; 61/931,785 filed Jan. 27, 2014; 61/932,422 filed Jan. 28, 2014; and 61/933,442 filed Jan. 30, 2014; and all priority applications of any of the above thereof, each and every one of which is hereby incorporated by reference.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A power converter for powering an application requiring both single phase and three phase power, comprising:
   first and second single phase power portals and a three phase power portal;
   a first power module, comprising:
      a first energy-transfer reactance; and
      first and second bridge switch arrays interposed between said reactance, and said single phase power portals, respectively, and each comprising one bidirectional switching device for each port of said single phase power portals; and
   a second power module, comprising:
      a second energy-transfer reactance;
      third and fourth bridge switch arrays interposed between said reactance, and said second single phase and three phase power portals, respectively, and each comprising one bidirectional switching device for each port of said second single phase and three phase power portals; and
      an energy storage capacitor, reversibly connected across said second reactance through a full-bridge configuration.

2. The converter of claim 1, wherein said bridge arrays are symmetrically connected to said energy-transfer reactance.

3. The converter of claim 1, wherein said bridge arrays are full-bridge arrays.

4. The converter of claim 1, wherein each said portal is shunted by a capacitor which provides a low-impedance voltage source thereat.

5. The converter of claim 1, wherein said reactance comprises a transformer.

6. The converter of claim 1, wherein said reactance comprises a parallel combination of an inductor with a capacitor.

7. The converter of claim 1, wherein said reactance is driven at a base frequency which is less than half its resonant frequency.

8. A power converter, comprising:
   first and second single phase or three phase power portals, said power portals having different numbers of phases;
   an energy-transfer reactance;
   first and second bridge switch arrays interposed between said reactance, and said power portals, respectively, and each comprising one bidirectional switching device for each port of said power portals; and
   an energy storage capacitor, reversibly connected across said second reactance through a full-bridge configuration;
   wherein the power converter does not comprise electrolytic capacitative components.

9. The converter of claim 8, wherein said single phase power portal is a split phase power portal.

10. The converter of claim 8, wherein said bridge arrays are symmetrically connected to said energy-transfer reactance.

11. The converter of claim 8, wherein said bridge arrays are full-bridge arrays.

12. The converter of claim 8, further comprising a third switch array, which is connected to said reactance in parallel with said first and second switch arrays.

13. The converter of claim 8, wherein each said portal is shunted by a capacitor which provides a low-impedance voltage source thereat.

14. The converter of claim 8, wherein said reactance comprises a transformer.

15. The converter of claim 8, wherein said reactance comprises a parallel combination of an inductor with a capacitor.

16. The converter of claim 8, wherein said reactance is driven at a base frequency which is less than half its resonant frequency.

17. A power converter, comprising:
a single phase AC power portal and a three phase synchronous motor drive power portal;
an energy-transfer reactance; and
first and second bridge switch arrays interposed between said reactance, and said power portals, respectively, and each comprising one bidirectional switching device for each port of said power portals; and
a controller which is connected to operate said bridge switch arrays, with mutually exclusive conduction intervals between respective first and second ones of said bridge switch arrays, to drive current through said reactance in both directions during each cycle, and to deliver power pulsating at twice the input power frequency to said motor drive power portal.

18. The converter of claim 17, wherein said controller is configured to operate said bridge switch arrays to drive said motor at variable speed with unity power factor and low harmonics input.

19. The converter of claim 17, wherein said bridge arrays are symmetrically connected to said energy-transfer reactance.

20. The converter of claim 17, wherein said bridge arrays are full-bridge arrays.

21. The converter of claim 1, wherein each said bridge switch array comprises a second bidirectional switching device for each said port of the respective power portals.

22. The converter of claim 8, wherein each said bridge switch array comprises a second bidirectional switching device for each said port of said power portals.

23. The converter of claim 17, wherein each said bridge switch array comprises a second bidirectional switching device for each said port of said power portals.

* * * * *